(12) United States Patent
Hosek et al.

(10) Patent No.: US 8,222,892 B2
(45) Date of Patent: Jul. 17, 2012

(54) SENSOR FOR SIMULTANEOUS POSITION AND GAP MEASUREMENT

(75) Inventors: Martin Hosek, Lowell, MA (US); Christopher Hofmeister, Hampstead, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 496 days.

(21) Appl. No.: 12/163,802

(22) Filed: Jun. 27, 2008

(65) Prior Publication Data
US 2009/0033316 A1 Feb. 5, 2009

Related U.S. Application Data

(60) Provisional application No. 60/946,547, filed on Jun. 27, 2007.

(51) Int. Cl.
*G01B 7/14* (2006.01)
(52) U.S. Cl. ........... 324/207.18; 324/207.26; 324/207.2; 324/207.24
(58) Field of Classification Search . 324/207.17–207.25
See application file for complete search history.

(56) References Cited

U.S. PATENT DOCUMENTS

| | | | | |
|---|---|---|---|---|
| 2,564,221 A | * | 8/1951 | Hornfeck | 336/30 |
| 3,205,485 A | * | 9/1965 | Noltingk | 340/870.32 |
| 4,210,865 A | * | 7/1980 | Nikolaev et al. | 324/207.17 |
| 4,556,886 A | * | 12/1985 | Shimizu et al. | 340/870.32 |
| 4,628,499 A | | 12/1986 | Hammett | 364/167 |
| 4,717,874 A | * | 1/1988 | Ichikawa et al. | 324/207.16 |
| 4,774,465 A | | 9/1988 | Nilius | 324/208 |
| 5,003,260 A | | 3/1991 | Auchterlonie | 324/207.16 |
| 5,015,998 A | * | 5/1991 | Ellis et al. | 340/686.1 |
| 5,204,621 A | * | 4/1993 | Hermann et al. | 324/207.18 |
| 5,210,490 A | | 5/1993 | Munch et al. | 324/207.17 |
| 5,469,053 A | * | 11/1995 | Laughlin | 324/207.18 |
| 5,589,769 A | * | 12/1996 | Krahn | 324/207.26 |
| 5,606,256 A | * | 2/1997 | Takei | 324/207.21 |

(Continued)

FOREIGN PATENT DOCUMENTS
JP 60170702 9/1985

(Continued)

OTHER PUBLICATIONS

"A Novel Multi-DOF Precision Positioning Methodology Using Two-Axis Hall-Effect Sensors", Yusuke Kawato and Won-jong Kim, 2005 *American Control Conference*, p. 3042-3047.

(Continued)

*Primary Examiner* — Jay Patidar
(74) *Attorney, Agent, or Firm* — Perman & Green, LLP; Richard Pickreign

(57) ABSTRACT

An apparatus including a controller, a transport in communication with the controller having a movable portion and a transport path and a multi-dimensional position measurement device in communication with the controller, the multi-dimensional position measurement device including a plurality of transformers and at least one element attached to the movable portion, wherein the multi-dimensional position measurement device is configured so that a circuit is completed in at least one plurality of transformers as the at least one element passes proximate to the at least one of the plurality of transformers and the controller is configured to calculate a multi-dimensional position of the movable object based on an output of the at least one of the plurality of transformers, wherein the multi-dimensional position includes at least a gap between the movable portion and the plurality of transformers.

32 Claims, 13 Drawing Sheets

U.S. PATENT DOCUMENTS

| | | | |
|---|---|---|---|
| 6,018,881 A * | 2/2000 | Spies | 33/706 |
| 6,054,851 A * | 4/2000 | Masreliez et al. | 324/207.17 |
| 6,100,618 A | 8/2000 | Schoeb et al. | 310/90.5 |
| 6,100,681 A * | 8/2000 | Tsuruta | 324/207.2 |
| 6,509,732 B1 * | 1/2003 | Rhodes et al. | 324/207.12 |
| 6,563,306 B2 * | 5/2003 | Sato | 324/207.2 |
| 6,557,957 B2 | 6/2003 | Fujimoto et al. | |
| 6,625,517 B1 | 9/2003 | Bogdanov et al. | 700/193 |
| 6,661,220 B1 * | 12/2003 | Glehr | 324/207.17 |
| 6,781,524 B1 | 8/2004 | Clark et al. | 340/933 |
| 6,803,758 B1 * | 10/2004 | Nicholson | 324/207.18 |
| 6,810,754 B2 | 11/2004 | May | 73/862.33 |
| 6,952,086 B1 | 10/2005 | Krefta et al. | 318/135 |
| 7,135,855 B2 | 11/2006 | Nyce | 324/207.16 |
| 7,164,120 B2 | 1/2007 | Strasser | 250/231.16 |
| 7,196,604 B2 | 3/2007 | Sills et al. | 335/306 |
| 7,208,945 B2 | 4/2007 | Jones et al. | 324/288 |
| 7,248,037 B2 * | 7/2007 | Hara et al. | 324/207.24 |
| 2002/0097042 A1 * | 7/2002 | Kawate et al. | 324/207.17 |
| 2004/0075426 A1 | 4/2004 | Wakiyama et al. | |

FOREIGN PATENT DOCUMENTS

| | | | |
|---|---|---|---|
| JP | 60170702 A * | 9/1985 | |
| WO | WO01/02211 | 1/2001 | |

OTHER PUBLICATIONS

"The Long-Range Scanning Stage: A Novel Platform for Scanned-Probe Microscopy", M. Holmes et al., *Journal of the Int'l Societies for Precision Engineering and Nanotechnology*, p. 191-209.

"54.6: A New Two-Axis Magnetic Position Sensor", C. Schott et al., p. 911-915.

* cited by examiner

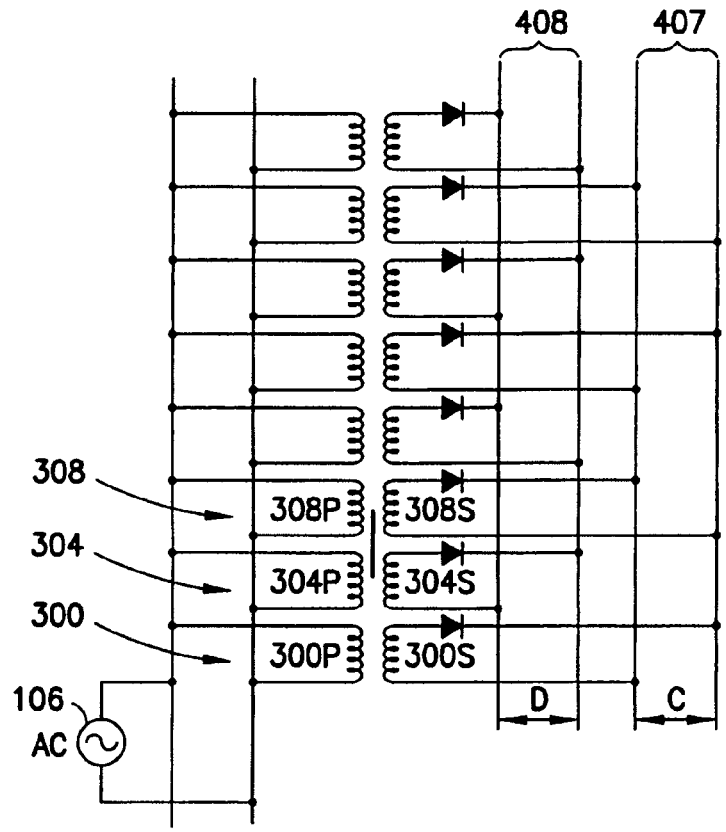
FIG.4
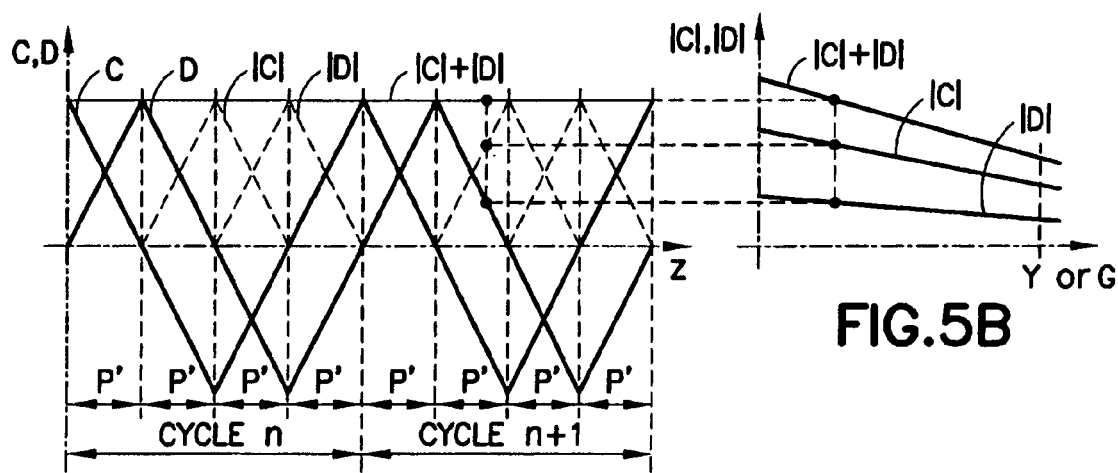
FIG.5A
FIG.5B

SENSOR FOR SIMULTANEOUS POSITION AND GAP MEASUREMENT

CROSS-REFERENCE TO RELATED APPLICATION(S)

This application claims the benefit of U.S. Provisional Patent Application No. 60/946,547, filed on Jun. 27, 2007, the disclosure of which is incorporated by reference herein in its entirety.

BACKGROUND

1. Field

The present embodiments relate to position sensors and, more particularly, to position sensors for detecting a position of an object in multiple dimensions.

2. Brief Description of Related Developments

A number of methods exist for determining the position of a moving object. For example, there are vehicle guidance systems that use radar signals that interact with stripes on a roadway to determine the position of an automobile. Other position systems utilize wireless radio communications. However, both of these systems require a source of power to be available on the moving object. The radio waves are also subject to degradation from intervening structures and electrical signals.

Position may also be determined by, for example a linear variable differential transformer (LVDT) which is a displacement transducer which utilizes a single primary and two secondary windings wound around a cylindrical bobbin. A movable nickel-iron core or armature is positioned inside the windings and the movement of the core is measured to obtain the position of the movable object. Hall effect sensors may be used in a similar manner to measure displacement. Generally LVDTs and Hall effect sensors are used to measure finite displacements such as the displacement of linear actuators and pistons.

For high precision positioning systems such as steppers, suspension and/or scanning stages and the like, conventional methods of position measurement use capacitive, inductive, optical and laser sensors. These sensors generally provide high resolution coupled with low positioning noise. However, the overall cost, limitations in travel range and desired number of degrees of freedom narrow the field of their applications.

It would be advantageous to be able to measure the position of a moving object simultaneously along multiple axes. It would also be advantageous to be able to measure a multi-dimensional position of an object over extended lengths of travel.

BRIEF DESCRIPTION OF THE DRAWINGS

The foregoing aspects and other features of the disclosed embodiments are explained in the following description, taken in connection with the accompanying drawings, wherein:

FIG. 4 illustrates a schematic diagram of the sensor in accordance with an exemplary embodiment;

FIG. 5A shows a graph of an output signal generated by a sensor in accordance with an exemplary embodiment;

FIG. 5B shows a graph illustrating the relationship between the sensor output and an air gap in accordance with an exemplary embodiment;

DETAILED DESCRIPTION OF THE EXEMPLARY EMBODIMENT(s)

Figure 1:
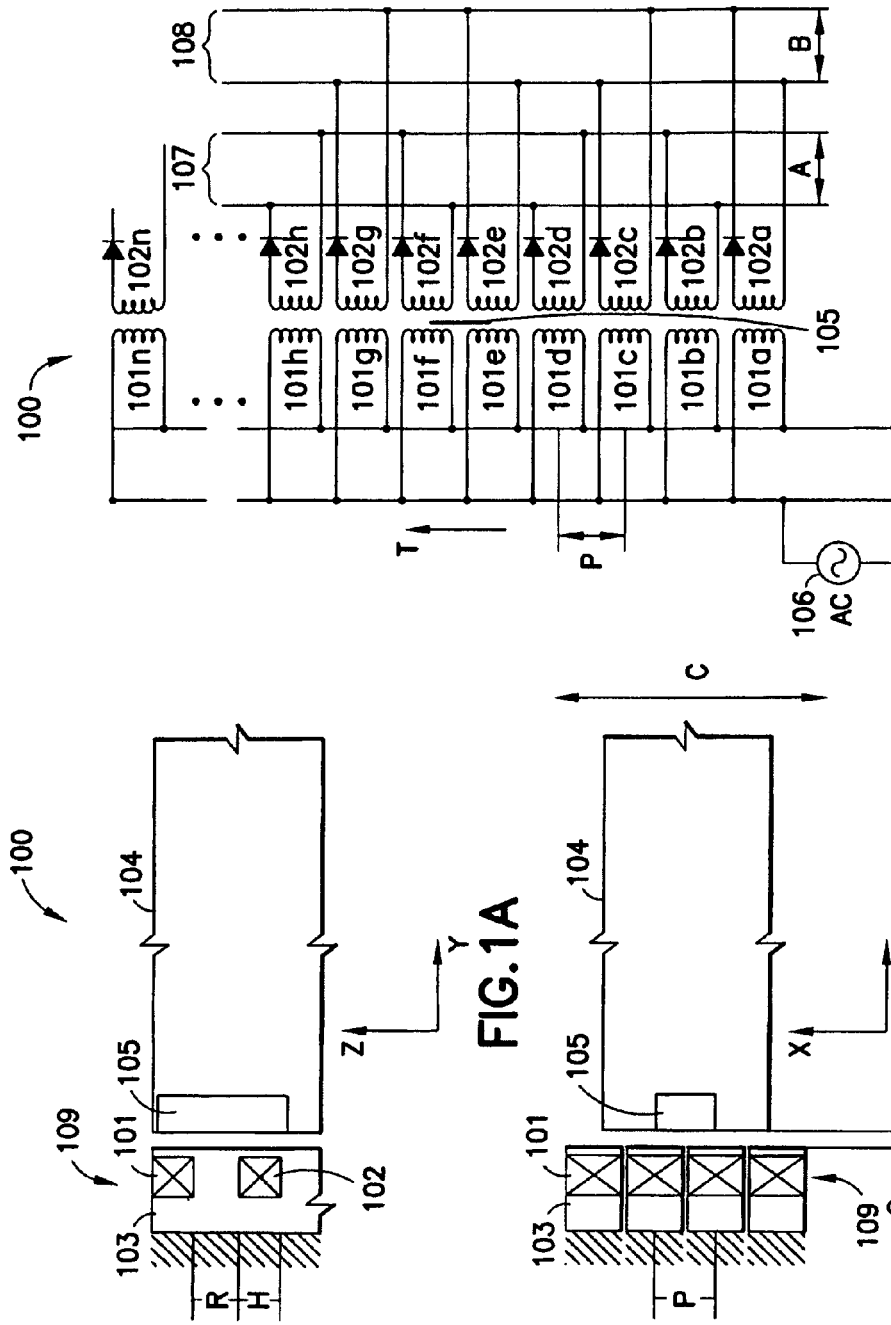
FIG. 1A illustrates a side view of a sensor in accordance with an exemplary embodiment.
FIG. 1B illustrates a top view of the sensor of FIG. 1A in accordance with an exemplary embodiment.
FIG. 1C illustrates a schematic diagram of a sensor in accordance with an exemplary embodiment.

FIGS. 1A-1C illustrate an exemplary configuration of a sensor 100 for simultaneous measurements along multiple axes in accordance with an exemplary embodiment. Although the embodiments disclosed will be described with reference to the drawings, it should be understood that the embodiments disclosed can be embodied in many alternate forms of embodiments. In addition, any suitable size, shape or type of elements or materials could be used.

The exemplary embodiments provide a sensor 100 configured to provide, for example, unlimited length positional measurement along a first axis, simultaneous positional measurement along a second axis and measurement of a position in a plane while utilizing the same sensors for each of the multi-dimensional measurements. As a non-limiting example, the sensor 100 may be utilized in a magnetically levitated transport or platen, such as that disclosed in United States Patent Publication No. 2004/0151562 and U.S. patent application Ser. No. 12/163,996, entitled "ROBOT DRIVE WITH MAGNETIC SPINDLE BEARINGS", and filed on Jun. 27, 2008, the disclosures of which are incorporated herein by reference in their entirety, to measure the transport's position along a direction of travel of any suitable distance, the gap between the platen and a fixed surface and the planar position or orientation of the platen. It should be realized that the exemplary sensors disclosed herein can be utilized to sense the position of any suitable movable object, including but not limited to, objects that are movable in one dimension or multiple dimensions, including but not limited to, transports and actuators. It should also be realized that while the exemplary embodiments are described with respect to linear drive system that the exemplary embodiments can be applied to rotary drive systems in a manner substantially similar to that described below.

As can be seen in FIG. 1A a cross sectional view of the sensor 100 is shown. In one exemplary embodiment, the sensor 100 includes a set of discrete stationary transformers 109 distributed, for example, on any desired reference frame along the direction or plane of motion C (See FIG. 1B) of a movable object 104 relative to the reference frame. The sensor 100 also includes an element 105 attached to the moving object 104 so that the element 105 closes the circuits of the transformers 109 when the element 105 is in the vicinity of a respective one of the discrete transformers 109. For exemplary purposes only, the circuits of the discrete transformers 109 will be described herein as magnetic circuits and the element 105 will be described as an iron element. However, it should be realized that in alternate embodiments the circuit may be any suitable circuit and that the element 105 may be any suitable element made of any suitable material that can close the circuit of the discrete transformers 109.

In the exemplary embodiment, each of the discrete transformers 109 of sensor 100 may be generally similar to each other. Each one of the discrete stationary transformers 109, may include for example a set of primary windings 101 and a set of secondary windings 102 (i.e. a winding set) wound around a common core 103. The core 103 may be an open iron core. In alternate embodiments the core may have any suitable configuration and be made of any suitable material. In other alternate embodiments, there may be more than one set of each of the primary and secondary windings 101, 102. In this exemplary embodiment the primary windings 101 of the discrete transformers 109 are located above the secondary windings 102 of the discrete transformers 109, but in alternate embodiments the secondary windings 102 may be located above the primary windings 101 or in any other suitable location relative to the primary windings. The primary and secondary windings of the discrete transformers 109 may be made of any suitable conductive material including, but not limited to, steel and copper. The primary and secondary windings 101, 102 may be spaced apart from each other any suitable distance R.

The iron element 105 attached to the movable object 104 may have any suitable shape and size so that as the iron element 105 passes in the vicinity of or adjacent to the primary and secondary windings 101, 102 of each of the discrete transformers 109 the circuit between the primary and secondary windings 101, 102 is closed. In FIG. 1A, the iron element 105 is shown, for example purposes only, as having a length that substantially spans both the primary and secondary windings 101, 102 of a respective discrete transformer 109. In this exemplary embodiment the iron element 105 bridges the spacing R between the primary and secondary windings 101, 102 to close the circuit of the discrete transformer 109. In alternate embodiments the element may be configured as desired to close the circuit between the primary and secondary windings in any suitable manner when the element 105 traverses past the corresponding one of the discrete transformers. The iron element 105 is also shown as substantially covering the height H of each of the windings 101, 102 of the discrete transformers as well. However, in alternate embodiments, the iron element may or may not cover the height H of the windings 101, 102 of each discrete transformer 109. In one exemplary embodiment, as can be seen in FIG. 1B, the iron element 105 may be substantially the same width as the windings 101, 102 of a discrete transformer 109. In alternate embodiments, the element 105 may have a width that is greater or smaller than the width of the windings 101, 102 of a discrete transformer 109. It is noted that any suitable number of iron elements 105 may be affixed to the movable object 104. It is also noted that the iron element(s) 105 may be positioned at any suitable place on the movable object 104 at which the position and gap are to be measured. For example, the iron elements 105 may be placed along any suitable length of a side of the object 104, at each corner of the object 104, on the top or bottom of the object or in any other suitable place depending on, for example, the size and shape of the object and which portion of the object is to be positionally tracked. Because the position and gap are measured at a fixed point on the moving object 104, the motion control of the object 104 can be optimized.

Referring now to FIG. 1B, which shows a top view of the sensor 100, and FIG. 1C which is a schematic drawing of the sensor, any suitable number of the discrete transformers 109 (e.g. windings 101, 102 and corresponding cores 103) may be distributed along, for example, a stationary surface in the direction C of travel of the movable object 104. In this example the direction of travel is in the X direction, but in alternate embodiments the direction of travel may be along any suitable axis or a combination of axes. Any suitable number of discrete transformers 109 may be placed along the direction of travel C so that the sensor 100 has a substantially unlimited sensing range in the object's direction of travel C. The discrete transformers 109 may be spaced apart from each other by a pitch P. The pitch P may be any suitable distance and may correspond to a resolution of the sensor 100. For example the finer the pitch the higher the resolution of the sensor and vice versa. As will be described in greater detail below, as the mobile element 105 moves along the direction or plane of travel, the element 105 may close, for example, the magnetic circuits (for the corresponding primary-secondary winding set 101, 102) of the respective discrete transformer 109 in the vicinity so that the position of the element 105 in the direction C, or plane of travel, as well as the gap G, between the element 105 and reference frame can be determined from the voltages induced in the secondary windings 102 of the discrete transformers 109.

Figure 2:
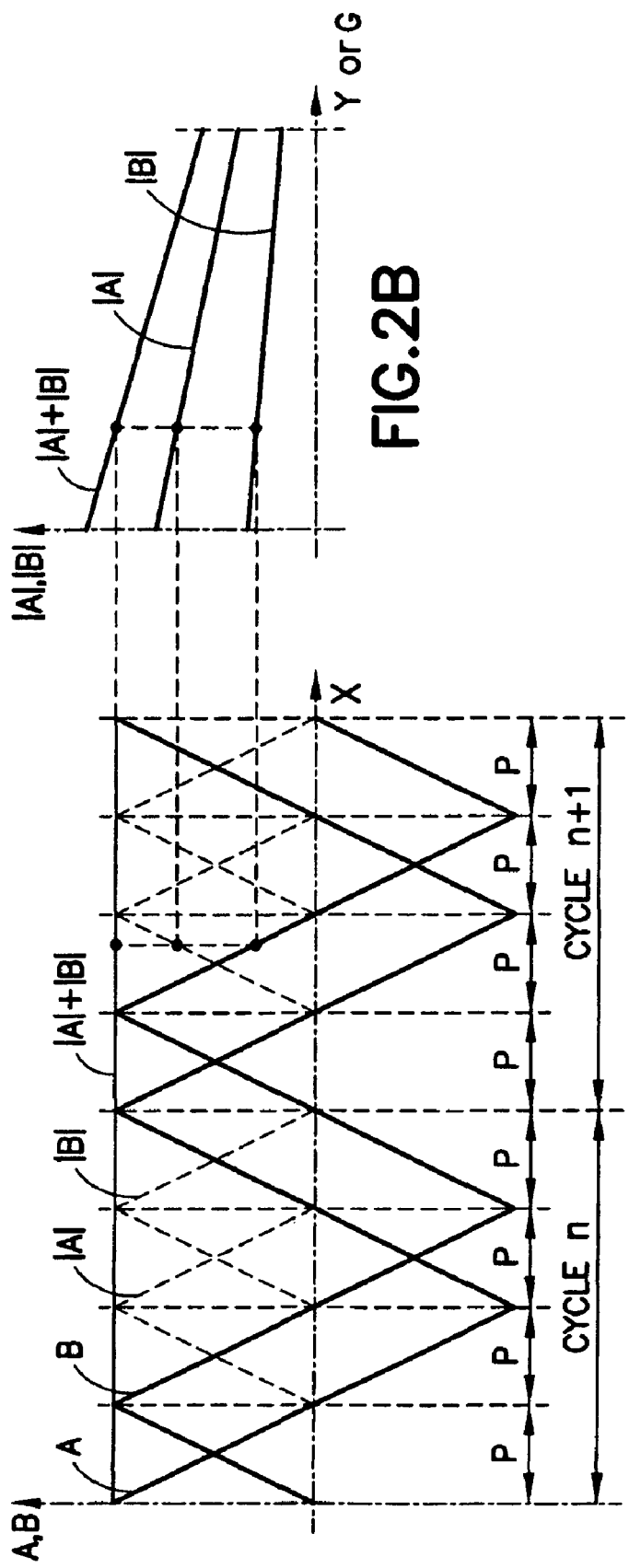
FIG. 2A shows a graph of an output signal generated by a sensor in accordance with an exemplary embodiment.
FIG. 2B shows a graph illustrating the relationship between the sensor output and an air gap in accordance with an exemplary embodiment.

As can be seen in FIG. 1C, the primary windings $101a$-$101n$ of each of the discrete transformers 109 may be connected to and powered by an alternating current source 106 (shown as a common source, though in alternate embodiments, one or more transformers may employ different sources of alternating current to power corresponding primary windings). In alternate embodiments the primary windings 101 of the discrete transformers 109 may be connected to any suitable power source. The secondary windings $102a$-$102n$ of each of the discrete transformers 109 may be connected, in an alternating configuration as seen in FIG. 1C, to voltage buses 107, 108 so that consecutive (e.g. $102a$, $102c$, $102e$, etc. for bus 108 and $102b$, $102d$, $102f$, etc. for bus 107) secondary windings on each bus 107, 108 have an alternating polarity. For example, referring to voltage bus 108 secondary winding $102a$ may have a first polarity and secondary winding $102c$ may have a second polarity (different from the first polarity, e.g. a reverse polarity) and so on such that the signed amplitudes of the voltages for each consecutive discrete transformer along the bus 108 forms a saw tooth signal B as can be seen in FIG. 2A. Similarly, referring to bus 107, secondary winding $102b$ may have a first polarity and secondary winding $102d$ may have a second polarity (different from the first polarity, e.g. a reverse polarity) and so on such that the signed amplitudes of the voltages for each consecutive discrete transformer along the bus 107 forms a saw tooth signal A as can be seen in FIG. 2A. The discrete transformers are serially positioned (as shown, for example, in FIG. 1C) so that signals generated by corresponding secondary windings of adjacent transformers that are transmitted respectively along busses 107, 108 are phase shifted by a desired phase angle. In this exemplary embodiment, as will be described in greater detail below, the signed voltages from buses 107, 108 are phase shifted by, for example, about 90°.

In operation, when the element 105 is not in the vicinity of or adjacent to the core 103, the voltages induced in the secondary windings 102 of the discrete transformers 109 are small and balanced (as compared to when the element is in the vicinity or adjacent a respective core 103), resulting in substantially zero voltages A, B across the buses 107, 108. As the iron element 105 moves in the direction of travel C past the discrete transformers 109, it closes the magnetic circuits for the primary and secondary winding pairs of the discrete transformers 109 that are in the vicinity of or adjacent to the iron element 105. For example, referring to FIG. 1C, the element 105 is located in the vicinity of discrete transformers corresponding to winding pairs 101e-102e and 101f-102f such that the magnetic circuits for the winding pairs are at least partially closed. In this example, if the iron element 105 is moving in the direction T the circuit between the winding pair 101e-102e would be opening and the circuit between winding pair 101f-102f would be closing. Here the voltage induced in the winding pair 101e-102e would be decreasing while the voltage induced in the discrete transformer corresponding to winding pair 101f-102f would be increasing where the voltages increase and decrease according to a respective polarity of the corresponding discrete transformers 109 to form the saw tooth signals A, B of FIG. 2A. The voltage induced in a particular winding pair may be proportional to the directional overlap between the iron element 105 and the iron core 103 associated with that particular winding pair. In this example the directional overlap would be in the direction T along the X-axis. In alternate embodiments the overlap may be along any suitable direction of travel in any suitable axis.

Referring again to FIG. 2A, an exemplary graph of the output or induced voltage A, B in the secondary windings across buses 107, 108 is shown. As can be seen in the Figure, the amplitudes of the voltages A, B are plotted along the vertical axis while the distance of travel along the X-axis is plotted along the horizontal axis of the graph. As the iron element 105 passes in the vicinity of each of the discrete transformers 109, the voltage induced in the respective secondary windings 102a-102n produces an output signal with a substantially saw toothed profile as described above. As can be seen in FIG. 2A, the two output signals A, B substantially have a sine/cosine relationship and are phase shifted by one pitch P of the winding pairs. In this example, the phase shift is about 90° but in alternate embodiments the two output signals may be phase shifted by any suitable amount. In one embodiment the phase shift may be achieved through the spacing of the discrete transformers 109 with respect to their respective buses 107, 108. In alternate embodiments the phase shift may be achieved in any suitable manner. Because the secondary windings 102a-102n of each discrete transformer 109 have alternating polarities with respect to their respective buses 107, 108 as described above, the period or cycle n of each of the two signals A, B is about four times the pitch or 4P. In alternate embodiments, the period or cycle of the signals A, B may have any suitable length that may be greater or less than 4P.

The position of the iron element 150 along the direction of motion, which in this example is along the X-axis may be obtained by, for example, controller 1090 (see FIG. 10) or any other suitable processor connected to sensor 100 from the two voltage signals A, B through, for example, the following exemplary equation:

$$x = x_0 + K_X \left[ \frac{B\sin(A) - A\sin(B)}{|A| + |B|} \right] \quad [1]$$

where x is the position of the iron element 105 measured along the X-axis, A and B are the two induced voltage signals produced by the sensor 100, $x_0$ and $K_X$ are calibration constants for travel in the X-direction and |A| and |B| are the absolute values of the signals A and B respectively.

Figure 10:
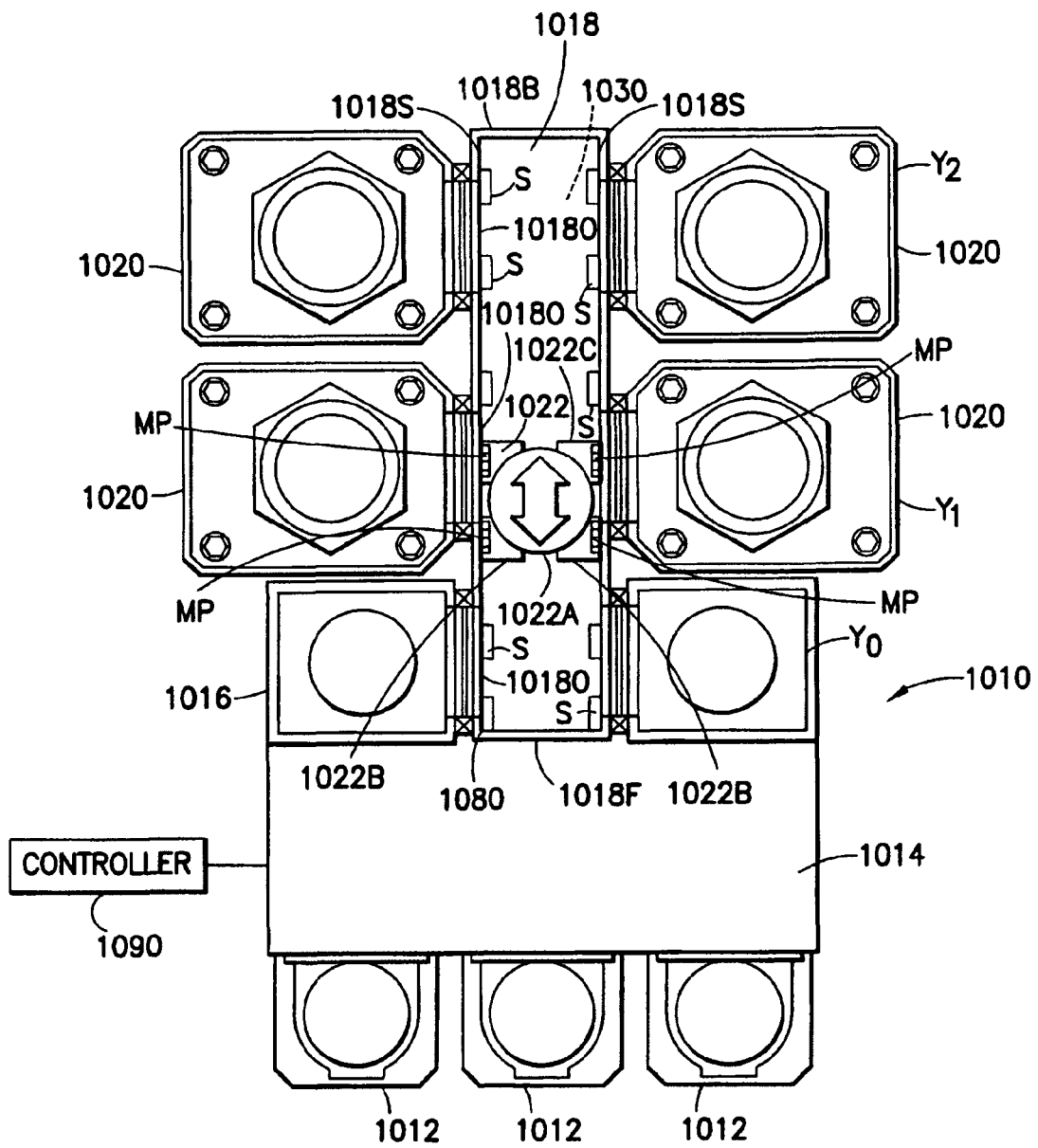
FIGS. 10-16 illustrate schematic views of processing equipment incorporating features of the exemplary embodiments.

It is noted that equation [1] may provide continuous positional information within one cycle n or four times the pitch 4P. In alternate embodiments, equations may be derived without parting from exemplary embodiments for providing continuous positional information for more or less than one cycle. In one embodiment, the sensor 100 may be utilized as an incremental encoder where the absolute position of the iron element 105 along a substantially unlimited length of travel in the X-direction can be obtained based on a transition count of the periodic signals A, B. In alternate embodiments the sensor 100 may be used as an absolute encoder. In other alternate embodiments, the position of each discrete transformer 109 at the beginning of each cycle n may be known and stored in a memory of any suitable controller, such as controller 1090 (FIG. 10). In one exemplary embodiment the controller 1090 may be part of clustered control architecture as described in U.S. patent application Ser. No. 11/178,615, filed on Jul. 11, 2005, the disclosure of which is incorporated by reference herein in its entirety. The controller 1090 may determine which winding pair circuits of the respective discrete transformers 109 are closed or at least partially closed and use the recorded position of the respective discrete transformer as a base measurement and add or subtract the distance within the cycle n determined by equation [1] from the recorded position to obtain the position of the iron element 105. In alternate embodiments, the information obtained from the sensor 100 may be utilized in any suitable manner to measure the position of the iron element 105. It is noted that controller 1090 may include software and computer programs incorporating the process steps and instructions described herein and may utilize storage devices (e.g. any suitable computer readable medium) with computer readable program code for carrying out, for example the calculations and controls described herein.

In one exemplary embodiment where the position of the iron core 105 is measured by, for example, counting the transitions of the periodic signals A, B, the sensor 100 may be used in conjunction with a motor where the cycles n of the sensor 100 are aligned with the electrical cycle of the motor so that the motor can be commutated without knowledge of the absolute position in a power-up situation. Examples of suitable motors include, but are not limited to, brushless or brush direct current motors and brushless or brush alternating current motors.

Referring now to FIGS. 1A, 1B and 2B the amplitude of the induced voltage signals A, B depends on the gap G (See FIGS. 1A and 1B) between the iron element 105 and the iron core 103 measured along, for example, the Y-axis (or any other suitable axis). As can be seen in FIG. 2B the relationship between the amplitude of the absolute values |A|, |B| of the signals A, B respectively and the gap G along the Y-axis is shown. In this example, the sum of the absolute value of A, B is plotted along the vertical axis while the distance along the Y-axis or gap G is plotted along the horizontal axis of the chart. As can be seen, the greater the amplitude of the absolute value of either |A| or |B| or the greater the sum of the absolute values of |A| and |B| the smaller the gap G.

As such, the gap between the iron element 150 and the core 103 along, for example the Y-axis may be obtained by the controller 1090 from the two voltage signals A, B through, for example, the following exemplary equation:

$$y \approx y_0 - K_Y[|A|+|B|] \quad [2]$$

where y is the gap between the iron element 105 and the core 103 measured along the Y-axis, A and B are the two induced voltage signals produced by the sensor 100, $y_0$ and $K_y$ are calibration constants in the Y-direction and |A| and |B| are the absolute values of the signals A and B respectively. It is noted that the exemplary Equation [2] pertaining to the calculation of the gap G is linearized around the expected point of operation. In alternate embodiments, the position of the iron element 105 and the gap G may be calculated using any suitable equations and/or values.

So far the exemplary embodiments have been described with respect to the positional measurement of the movable object 104 in two dimensions (i.e. along the X-axis and the air gap between the object 104 and the core 103). However, in another exemplary embodiments, the sensor 100 may be utilized to obtain the positional measurement of the movable object in more than two dimensions (e.g. planar position and air gap measurement) although in alternate embodiments it should be realized that the sensor 100 can also measure position along a single axis. For example, referring to FIG. 3, the winding sets and their respective discrete transformers 300-311 may be distributed along any suitable number of axes. In this example, the discrete transformers 300-311 are distributed along the X-axis and the Z-axis. It should be realized that the use of the X and Z axes is merely exemplary in nature and that any suitable axes may be used. In this exemplary embodiment the X-axis and Z-axis are orthogonal to one another, but in alternate embodiments the axes may have any suitable angular relation to each other such. For example, the axes may have an angular relationship of more or less than ninety degrees.

Figure 3:
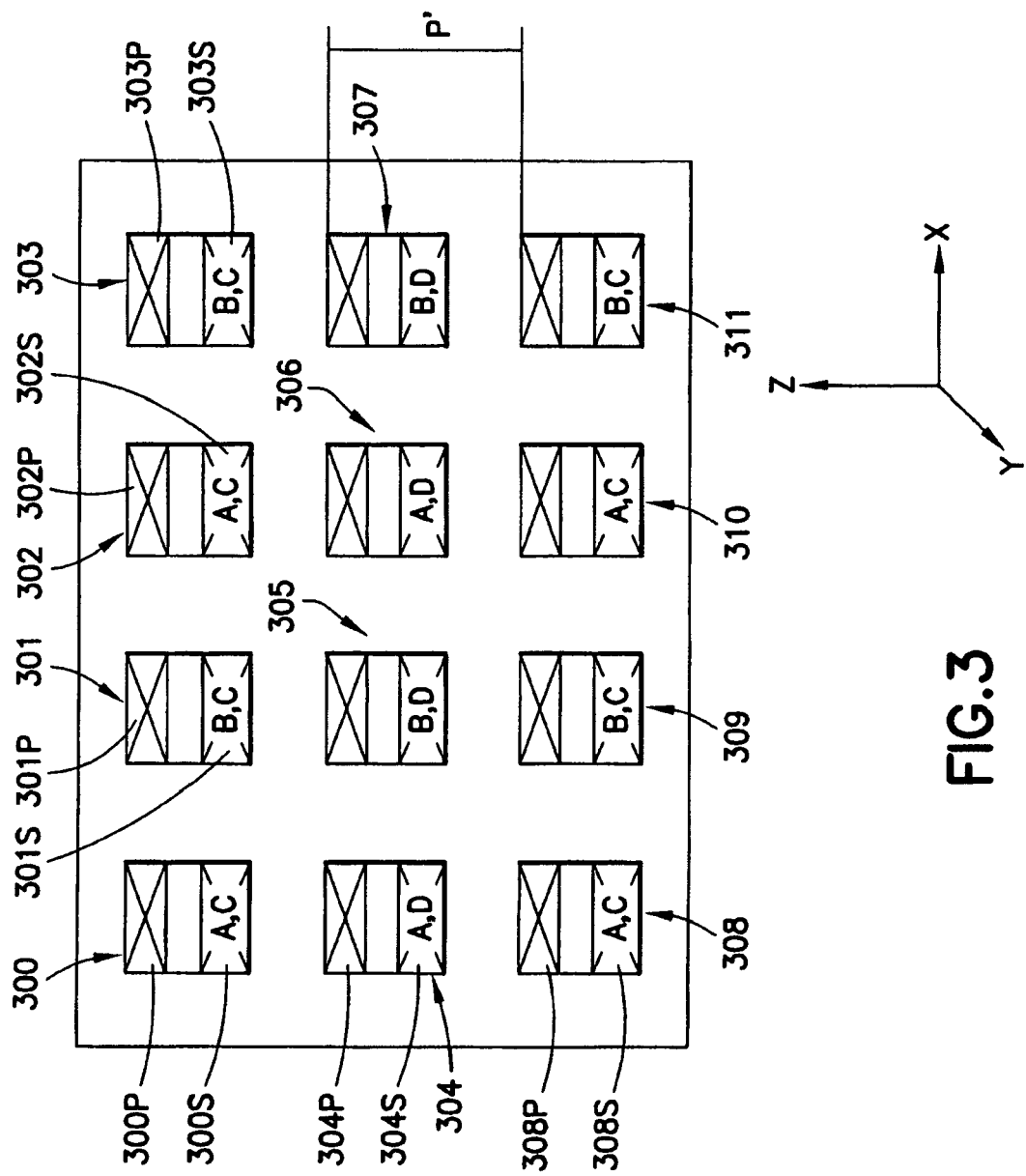
FIG. 3 illustrates a schematic view of a sensor in accordance with an exemplary embodiment.

In the exemplary embodiment shown in FIG. 3, the discrete transformers 300-311 are shown as having a grid pattern or configuration but in alternate embodiments the discrete transformers 300-311 may have any suitable pattern including, but not limited to, "L" shaped patterns, "T" shaped patterns or cross shaped patterns. In this exemplary embodiment, the primary and secondary windings (which are designated in FIG. 3 by the suffix P for primary and S for secondary which is used in conjunction with a respective discrete transducer reference number) in each discrete transducer 300-311 and the iron element 105 may be suitably sized and shaped and the discrete transformers 300-311 may have a suitable spacing relative to each other so that a substantially saw toothed output profile is produced with respect to the X and Z axes as will be described in greater detail below.

In this example, the discrete transformers, such as transformers 300-303 and their respective winding sets are arranged along the X-axis in a manner substantially similar to that described above with respect to FIGS. 1A and 1B. The windings sets of the discrete transformers 300-311 may be connected to buses 107, 108 in a manner substantially similar to that described above with respect to FIG. 1C. For example, the discrete transformers 300-303 have primary windings 300P-303P and secondary windings 300S-303S respectively. Secondary winding 300S may be connected to bus 107 and produce the voltage signal A, secondary winding 301S may be connected to bus 108 and produce the voltage signal B, secondary winding 302S may be connected to bus 107 and produce the voltage signal A and so on. As can be seen in FIG. 4, the secondary windings may also be connected to busses 407, 408 for measuring the distance along the Z-axis in a manner substantially similar to that described with respect to FIG. 1C and as will be described below.

The discrete transformers, for example discrete transformers 300, 304, 308 are arranged along the Z-axis in a similar manner. For example, the discrete transformers 300, 304, 308 also have primary windings 300P, 304P, 308P and secondary windings 300S, 304S, 308S such that the secondary windings 300S, 304S, 308S are connected to bus 107 to produce the voltage signal A. However, the secondary windings 300S, 304S, 308S may also be connected to voltage busses 407 and 408 to produce voltage signals C and D respectively as can be seen in FIG. 4. The secondary windings, such as windings 300S, 304S, 308S may be connected to the busses 407, 408 in an alternating manner such that, for example, winding 300S may be connected to the bus 407 to produce the voltage signal C, winding 304S may be connected to the bus 408 to produce the voltage signal D and winding 308S may be connected to the bus 407 to produce the voltage signal D. It is noted that the voltage signals A and B may be used to measure the distance along the X axis as described above while the voltage signals C and D may be used to measure the distance along the Z-axis as will be described below. It is noted that only some of the secondary windings shown in FIG. 3 are provided with reference numerals for clarity purposes, however all of the discrete transformers 300-311 are labeled in FIG. 3 with the voltage signals A, B, C, D that each of the secondary windings respectively produce.

As the iron element 105 moves adjacent to the discrete transformers 300-311, a substantially saw toothed signal similar to that shown in FIG. 2A may be produced for the X-axis, where the amplitude of the signals A and B depends on the gap G between the iron element 105 and the core 103 of each of the discrete transformers 300-311. In alternate embodiments iron element and discrete transformers may be configured to generate any suitably shaped signal. As such the position of the iron element 105 along the X-axis may be calculated by controller 1090 as described above with respect to equation [1] and the gap may be calculated as described above with respect to equation [2]. In alternate embodiments the position and gap may be calculated in any suitable manner.

In a manner substantially similar to that described above with respect to FIG. 1C, substantially saw toothed signals as shown in FIG. 5A may be produced for the Z-axis, where the amplitude of the signals C and D depends on the gap G between the iron element 105 and the core 103 of each of the discrete transformers 300-311. Signals C and D may also be phase shifted in a manner substantially similar to that described above with respect to signals A and B. As can be seen in FIG. 5A, an exemplary graph of the output or induced voltage C, D in the secondary windings of the discrete transformers 300-311 along, for example, the Z-axis is shown. The amplitudes of the voltage signals C, D are plotted along the vertical axis while the distance of travel along the Z-axis is plotted along the horizontal axis of the graph. As the iron element 105 passes in the vicinity of each of the discrete transformers 300-311 along the Z-axis, the induced voltage in the respective secondary windings produces an output signal with a substantially saw toothed profile. As described above, in alternate embodiments iron element and discrete transformers may be configured to generate any suitably shaped signal. As can be seen in FIG. 5A, the two output signals C, D substantially have a sine/cosine relationship and are phase shifted by one pitch P' of the winding pairs. Because consecutive (e.g. with respect to their respective busses 407, 408 in a manner similar to that described above with respect to FIG.

1C) secondary windings of each discrete transformer have alternating polarities along the Z-axis the period or cycle n of each of the two signals C, D is four times the pitch or 4P'. In alternate embodiments the cycle n of each of the signals C, D may be greater or less than 4P'. As may be realized the pitch P' along the Z-axis may be substantially equal to the pitch P along the X-axis. In alternate embodiments the pitch P' may be greater than or less than the pitch P so that different sensor resolutions may be provided along each respective axis.

The position of the iron element 150 along the Z-axis of motion may be obtained by the controller 1090 from the voltage signals C, D through, for example, the following exemplary equation:

$$z = z_0 + K_Z \left[ \frac{D\sin(C) - C\sin(D)}{|C| + |D|} \right] \quad [3]$$

where z is the position of the iron element 105 measured along the Z-axis, C and D are the two induced voltage signals produced by the sensor 100, $z_0$ and $K_Z$ are calibration constants for travel in the Z-direction and |C| and |D| are the absolute values of the signals C and D respectively.

It is noted that equation [3] may provide continuous positional information within one cycle n or four times the pitch 4P' along the Z-axis. In alternate embodiments, equations may be derived without parting from exemplary embodiments for providing continuous positional information for more or less than one cycle. In one embodiment, the sensor 100 may be utilized as an incremental encoder where the absolute position of the iron element 105 along a substantially unlimited length of travel in the Z-direction can be obtained based on a transition count of the periodic signals C, D. In alternate embodiments, the position of each discrete transformer at the beginning of each cycle n may be known and stored in a memory of a suitable controller, such as controller 1090. The controller 1090 may determine which discrete transformer circuits are closed or at least partially closed and use the recorded position as a base measurement and add or subtract the distance within the cycle n determined by, for example, equation [3] from the recorded position of the discrete transformer to obtain the position of the iron element 105. In alternate embodiments, the information obtained from the sensor may be utilized in any suitable manner to measure the position of the iron element 105 along the Z-axis.

As can be seen in FIG. 5B the relationship between the amplitude of the absolute values |C|, |D| of the signals C, D respectively along the Z-axis and the gap G along the Y-axis is shown. In this example, the sum of the absolute value of C, D is plotted along the vertical axis while the distance along the Y-axis or gap G is plotted along the horizontal axis of the chart. The greater the amplitude of the absolute value of either |C| or |D| or the greater the sum of the absolute values of |C| and |D| the smaller the gap G. As such the gap may be calculated by controller 1090 using, for example, Equation [2] or with, for example, the following equation:

$$y \approx y_0 - K_Y [|C| + |D|] \quad [4]$$

where y is the gap between the iron element 105 and the core 103 of a respective discrete transformer measured along the Y-axis, C and D are the two induced voltage signals produced by the sensor 100, $y_0$ and $K_Y$ are calibration constants in the Y-direction and |C| and |D| are the absolute values of the signals C and D respectively. It is noted that the exemplary Equation [3] pertaining to the calculation of the gap G is linearized around the expected point of operation. As noted above, in alternate embodiments, the position of the iron element 105 and the gap G may be calculated using any suitable equations and/or values.

Figure 6:
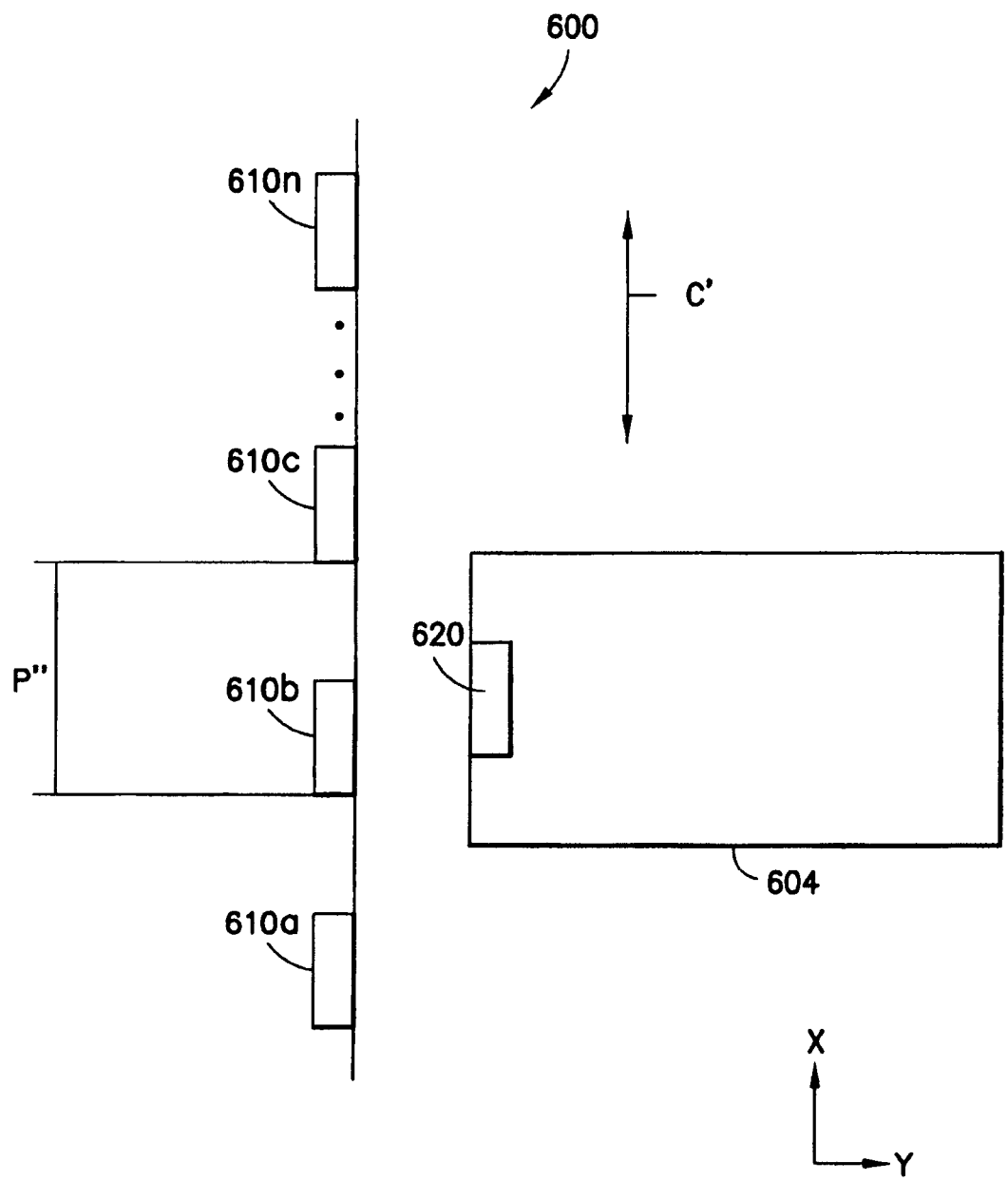
FIG. 6 is a schematic illustration of sensor in accordance with an exemplary embodiment.

In another exemplary embodiment, referring to FIG. 6, the sensor 600 may utilize field detecting sensors 610a-610n for the multi-dimensional position measurements. In one exemplary embodiment the field sensing sensors may be any suitable Hall effect sensors. In alternate embodiments the sensor 600 may be any suitable sensor. Sensors 610a-600n may be distributed at equal intervals along the direction of travel C' of a movable object 604. For example, the sensors 610a-610n may be spaced apart by a pitch P''' where the pitch P''' may be any suitable distance depending on the resolution of the sensor 600.

Figure 8A:
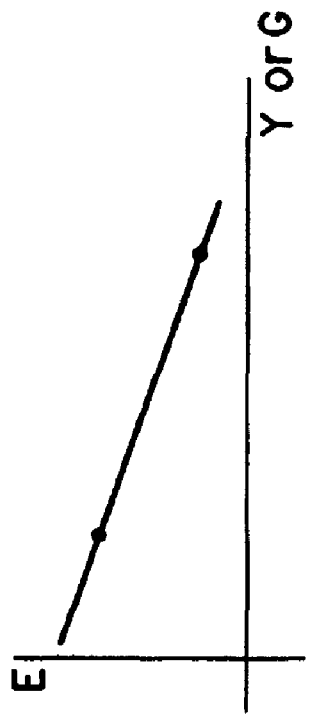
FIG. 8A shows a graph of an output signal generated by a sensor in accordance with an exemplary embodiment.

In this example a suitably shaped and sized magnet 620 may be attached to the movable object 604. However, in alternate embodiments any suitable field generating object that is capable of generating a field that can be sensed by the sensors may be attached to the movable object 604. In still other alternate embodiments the magnet 620 may be embedded in or form part of the movable object. In FIG. 6 the magnet 620 is shown flush mounted with the movable object 604 so that a distance between the magnet and the sensors 610a-610n substantially directly corresponds with a distance between the movable object 604 and the sensors. In alternate embodiments the magnet 620 may not be flush mounted to the movable object 604. As the movable object travels along path C', in for example the X-direction, sensors 610a-610n detect, for example, the magnetic field density of the magnet 620 as it passes in the vicinity of a respective one of the sensors 610a-610n. As the magnet 620 passes the sensors 610a-610n produce a substantially sinusoidal output signal E as can be seen in FIG. 8A. The distance along the X-axis can be determined by, for example, counting the cycles of the signal E, which may be determined by the maxima and/or minima of the sensor 610a-610n output. In alternate embodiments the period or cycle of the output E may be counted in any suitable manner. In still other alternate embodiments, the position of each of the sensors along, for example, the X-axis or any other suitable axis may be known and recorded in a memory of, for example, a controller connected to the sensor 600. A rough location of the movable object 604 can be determined by determining which sensor 610a-610n is outputting a signal. The distance along the X-axis can be refined by interpolating the position of the movable object when it is between the sensors 610a-610n (i.e. the location of the movable object within the pitch P'''). This interpolated or refined distance may be found by, for example, controller 1090 using any suitable interpolation technique where the result of the interpolation is either added to or subtracted from the cycle count or the location of the active sensor 610a-610n to accurately determine the position of the movable object along, for example, the X-axis.

Figure 8B:
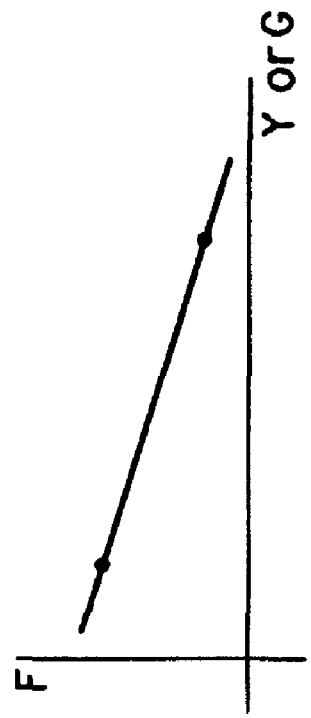
FIG. 8B shows a graph illustrating the relationship between the sensor output and an air gap in accordance with an exemplary embodiment.

Referring to FIG. 8B, the amplitude of the signal E depends on the gap G between the magnet 620 attached thereto and the a corresponding sensor 610a-610n in the vicinity of the magnet 620. For example, the greater the amplitude of the signal E the closer the magnet 620 or movable object 604 is to the sensors 610a-610n and vice versa. The gap G in this example is along the Y-axis, but it is noted again that the axes used to describe the exemplary embodiments are merely exemplary in nature and can be substituted with any suitable axes or coordinate system. In one exemplary embodiment, the gap G can be calculated by, the controller 1090 with for example a look up table that correlates the magnitude of the flux density sensed by the sensors 610a-610n with the distance of the magnet 620 and/or movable object 604. In other exemplary embodiments, the gap G may be calculated in a manner substantially similar to that described above with respect to, for example, equations [2] and [4]. Still in other alternate embodiments, the gap G may be calculated using any suitable equations or tables.

Figure 7:
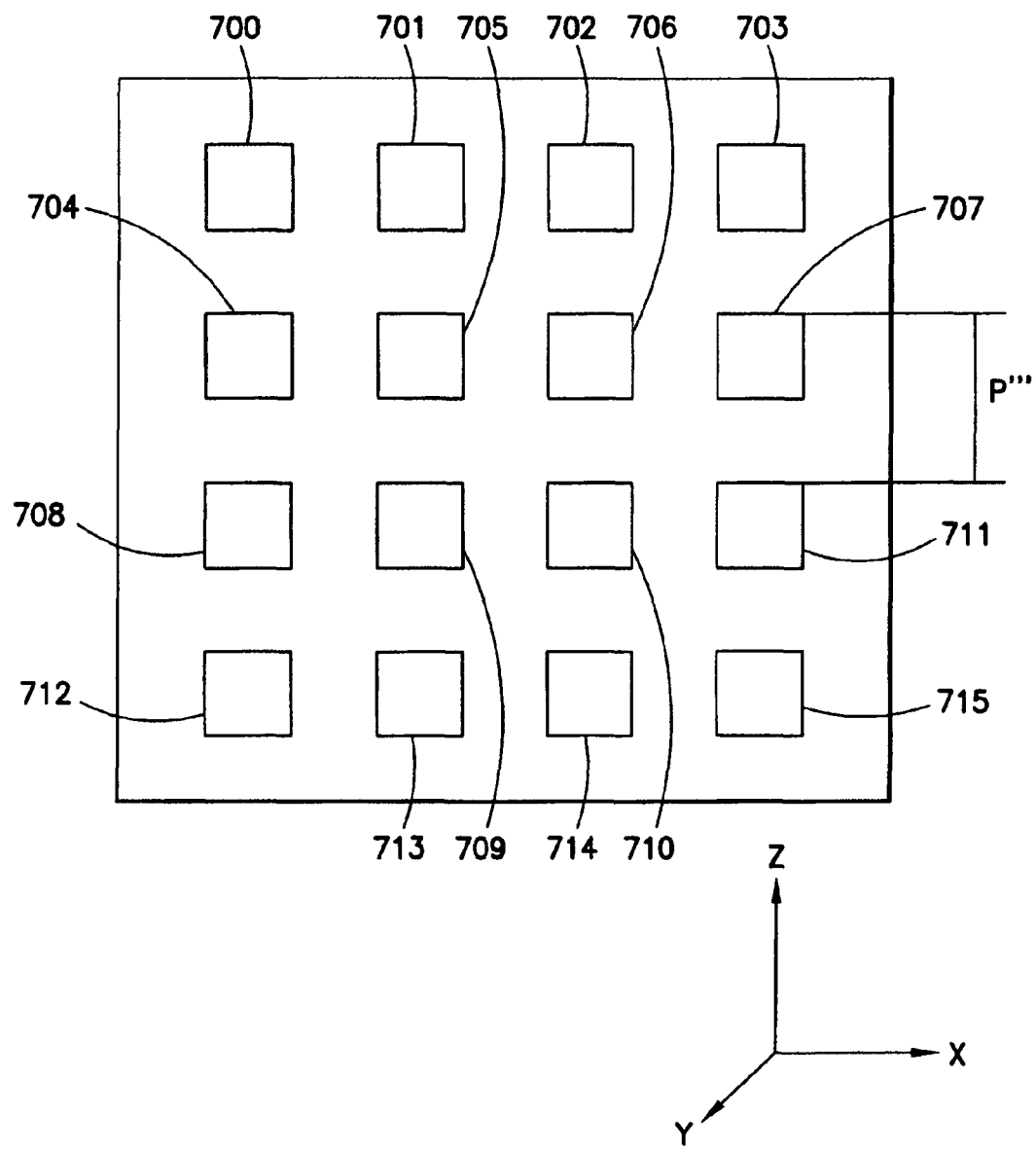
FIG. 7 is another schematic illustration of sensor in accordance with an exemplary embodiment.

Referring to FIG. 7, the field detecting sensors 700-715 may also be arranged along two orthogonal axes for the measurement of planar motion in addition to measurement of the air gap between the movable object 604 and the sensors 700-715 and/or movable object. In alternate embodiments the axes may have any suitable relationship with each other such as for example, the angle between the axes may be more or less than ninety degrees. In this exemplary embodiment, to measure planar motion in, for example, the plane X-z the sensors, such as sensors 700-703 may be arranged with a pitch P''' along the X-axis in a manner substantially similar to that described above with respect to FIG. 6. Sensors, such as sensors 700, 704, 708, 712, may also be arranged with a pitch P''' along the Z-axis. While the pitches along the X and Z axes are described as being the same in this example, in alternate embodiments the pitches along the different axes may be different from each other so as to provide different sensor resolutions (e.g. accuracy) with respect to the different axes.

Figure 9A:
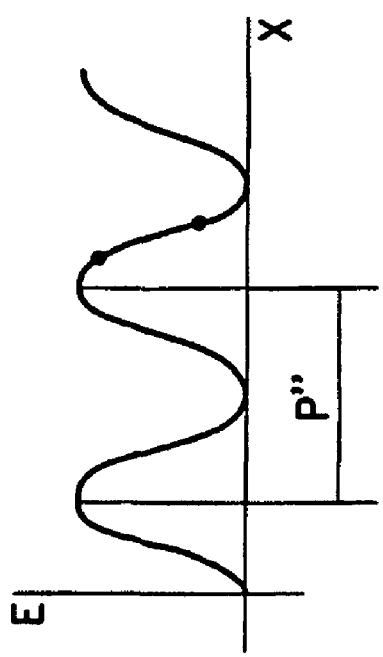
FIG. 9A shows a graph of an output signal generated by a sensor in accordance with an exemplary embodiment.

As the magnet 620 passes in the vicinity of, for example, the sensors 700-703 an output wave E substantially similar to that shown in FIG. 8A is produced. The determination of the position along the X-axis can be determined in a manner substantially similar to that described above with respect to 8A. Likewise as the magnet 620 passes in the vicinity of, for example, the sensors 700, 704, 708, 712 a sinusoidal output F is produced as can be seen in FIG. 9A. The distance along the Z-axis can be determined by counting the cycles of the signal F, which may be determined by, for example, the maxima and/or minima of the sensor output. In alternate embodiments the period or cycle of the output E may be counted in any suitable manner. In still other alternate embodiments, the position of each of the sensors 700-715 along the Z-axis may be known and recorded in a memory of, for example a controller connected to the sensor 600. A rough location of the movable object 604 can be determined by determining which sensor 700-715 is outputting a signal. The distance along the Z-axis can be refined by interpolating the position of the movable object when it is between the sensors 700-715 (i.e. the location of the movable object within the pitch P'''). This interpolated or refined distance may be found using any suitable interpolation technique where the result of the interpolation is either added to or subtracted from the cycle count or the location of the active sensor 700-715 to accurately determine the position of the movable object along the Z-axis.

Figure 9B:
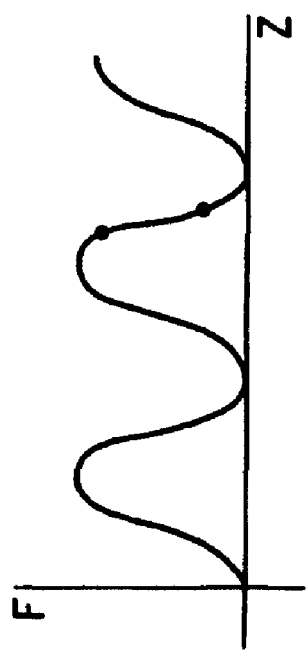
FIG. 9B shows a graph illustrating the relationship between the sensor output and an air gap in accordance with an exemplary embodiment.

Referring to FIG. 9B, the amplitude of the signal F depends on the gap G between the magnet 620 (and/or movable object) and the sensors 700-715 as described above. The gap G in this example can be calculated by controller 1090 with, for example, a look up table that correlates the magnitude of the flux density sensed by the sensors 700-715 with the distance of the movable object 604. In alternate embodiments, the gap may be calculated in a manner substantially similar to that described above with respect to, for example, equations [2] and [4]. In alternate embodiments the gap may be calculated using any suitable equations and/or tables.

In other embodiments the sensor 600 may include a magnetic platen in lieu of the magnet 620. The magnetic platen may have multiple magnets arranged with alternating magnetic poles as described in U.S. patent application Ser. No. 12/163,716 entitled "MULTIPLE DIMENSION SENSOR", and filed on Jun. 27, 2008, the disclosure of which is incorporated by reference herein in its entirety.

In operation, as described above the exemplary position measurement systems described herein may be utilized in any suitable facility having mechanized transports to, for example, transport product from one location to another location. For exemplary purposes only the operation of the exemplary position measurement systems will be described with respect to a semiconductor processing facility, but is should be realized that the exemplary position measurement systems can be utilized in any suitable facility and/or processing equipment as described above.

Referring now to FIG. 10 an exemplary semiconductor substrate processing apparatus 1010 in which aspects of the disclosed embodiments may be employed is shown. The processing apparatus 1010 is shown connected to an environmental front end module (EFEM) 1014 which has a number of load ports 1012. The load ports 1012 are capable of supporting a number of substrate storage canisters such as for example conventional FOUP canisters; though any other suitable type may be provided. The EFEM 1014 communicates with the processing apparatus through load locks 1016, which are connected to the processing apparatus. The EFEM 1014 (which may be open to atmosphere) has a substrate transport apparatus (not shown) capable of transporting substrates from load ports 1012 to load locks 1016. The EFEM 1014 may further include substrate alignment capability, batch handling capability, substrate and carrier identification capability or otherwise. In alternate embodiments, the load locks 1016 may interface directly with the load ports 1012 as in the case where the load locks have batch handling capability or in the case where the load locks have the ability to transfer wafers directly from the FOUP to the load lock. Some examples of such apparatus are disclosed in U.S. Pat. Nos. 6,071,059, 6,375,403, 6,461,094, 5,588,789, 5,613,821, 5,607,276, 5,644,925, 5,954,472, 6,120,229 and U.S. patent application Ser. No. 10/200,818 filed Jul. 22, 2002, the disclosures of which are incorporated by reference herein in their entirety. In alternate embodiments, other load lock options may be provided.

Figure 12:
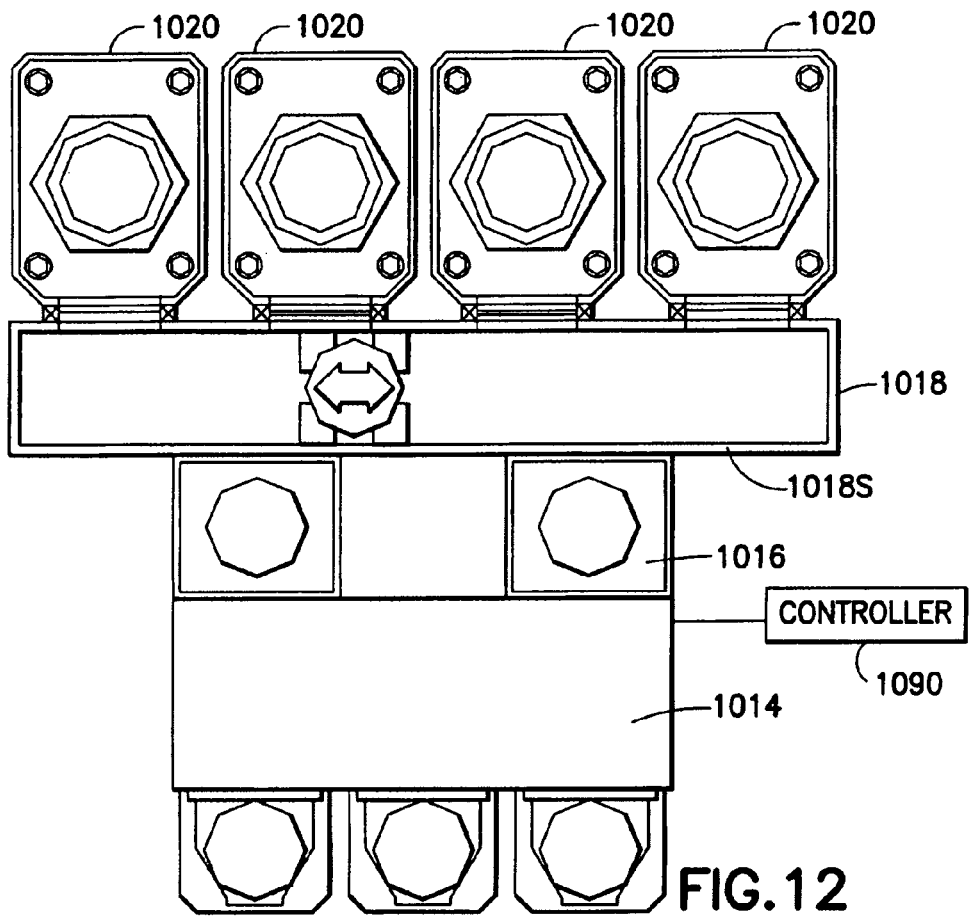
Figure 13:
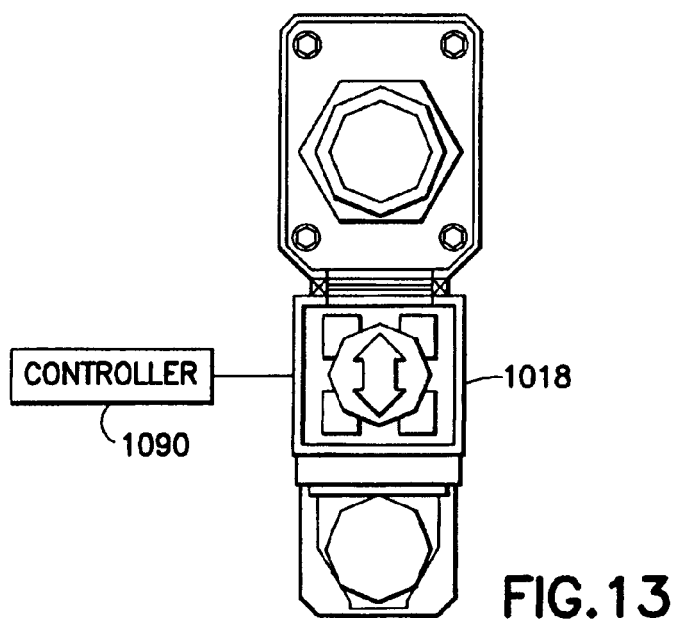

Still referring to FIG. 10, the processing apparatus 1010, which as noted before may be used for processing semiconductor substrates (e.g. 200/300 mm wafers or any other suitably sized wafers larger or smaller than 200/300 mm), panels for flat panel displays, or any other desired kind of substrate, generally comprises transport chamber 1018, processing modules 1020, and at least one substrate transport apparatus 1022. The substrate transport apparatus 1022 in the embodiment shown is integrated with the chamber 1018. In this embodiment, processing modules are mounted on both sides of the chamber 1018. In other embodiments, processing modules 1020 may be mounted on one side of the chamber 1018 as shown for example in FIG. 12. In the embodiment shown in FIG. 10, processing modules 1020 are mounted opposite each other in rows Y1, Y2 or vertical planes. In other alternate embodiments, the processing modules may be staggered from each other on the opposite sides of the transport chamber or stacked in a vertical direction relative to each other. The transport apparatus 1022 has a cart 1022C that is moved in the chamber 1018 to transport substrates between load locks 1016 and the processing chambers 1020. In the embodiment shown, only one cart 1022C is provided, but in alternate embodiments more carts may be provided. As seen in FIG. 10, the transport chamber 1018 (which may be subjected to vacuum or an inert atmosphere or simply a clean environment or a combination thereof in its interior) has a configuration, and employs a substrate transport apparatus 1022 that allows the processing modules to be mounted to the chamber 1018 in a Cartesian arrangement with modules arrayed in substantially parallel vertical planes or rows. This results in the processing apparatus 1010 having a more compact footprint than a comparable conventional processing apparatus (i.e. a conventional processing apparatus with the same number of processing modules)(See for example, FIG. 16). Moreover, the transport chamber 1018 may be capable of being provided with any desired length to add any desired number of processing modules, as will be described in greater detail below, in order to increase throughput. The transport chamber 1018 may also be capable of supporting any desired number of transport apparatus 1022 therein and allowing the transport apparatus 1022 to reach any desired processing chamber 1020 on the transport chamber 1018 without, for example, interfering with each other. This in effect may decouple the throughput of the processing apparatus from the handling capacity of the transport apparatus, and hence the processing apparatus throughput becomes processing limited rather than handling limited. Accordingly, throughput can be increased as desired by adding processing modules and corresponding handling capacity on the same platform.

Still referring to FIG. 10, the transport chamber 1018 in this embodiment has a general rectangular shape though in alternate embodiments the chamber may have any other suitable shape. The chamber 1018 has a slender shape (i.e. length much longer than width) and defines a generally linear transport path for the transport apparatus therein. The chamber 1018 has longitudinal side walls 1018S. The side walls 1018S have transport openings or ports 1018O formed therethrough. The transport ports 1018O are sized large enough to allow substrates to pass through the ports (which can be through valves) into and out of the transport chamber. As can be seen in FIG. 10, the processing modules 1020 in this embodiment are mounted outside the side walls 1018s with each processing module being aligned with a corresponding transport port in the transport chamber. As can be realized, each processing module 1020 may be sealed against the sides 1018S of the chamber 1018 around the periphery of the corresponding transport aperture to maintain the vacuum in the transport chamber. Each processing module may have a valve, controlled by any suitable means to close the transport port when desired. The transport ports 1018O may be located in the same horizontal plane. Accordingly, the processing modules on the chamber are also aligned in the same horizontal plane. In alternate embodiments the transport ports may be disposed in different horizontal planes. As seen in FIG. 10, in this embodiment, the load locks 1016 are mounted to the chamber sides 1018S at the two front most transport ports 1018O. This allows the load locks to be adjacent the EFEM 1014 at the front of the processing apparatus. In alternate embodiments, the load locks may be located at any other transport ports on the transport chamber such as shown for example in FIG. 12. The hexahedron shape of the transport chamber allows the length of the chamber to be selected as desired in order to mount as many rows of processing modules as desired (for example see FIGS. 11, 13-15 showing other embodiments in which the transport chamber length is such to accommodate any number of processing modules).

As noted before, the transport chamber 1018 in the embodiment shown in FIG. 10 has one substrate transport apparatus 1022 having a single cart 1022C. The transport apparatus 1022 is integrated with the chamber to translate cart 1022C back and forth in the chamber between front 1018F and back 1018B. The transport apparatus 1022 has cart 1022C having end effectors for holding one or more substrates. The cart 1022C of transport apparatus 1022 also has an articulated arm or movable transfer mechanism 1022A for extending and retracting the end effectors in order to pick or release substrates in the processing modules or load locks. To pick or release substrates from the processing modules/load ports, the transport apparatus 1022 may be aligned with desired module/port and the arm is extended/retracted through the corresponding port 1018O to position the end effector inside the module/port for the substrate pick/release.

The transport apparatus 1022, shown in FIG. 10 is a representative transport apparatus and, includes a cart 1022C which is supported from linear support/drive rails. The transport apparatus may be substantially similar to the magnetically levitated transport apparatus described in United States Patent Publication No. 2004/0151562 (previously incorporated by reference), although any suitable linear or rotary transport apparatus may be used. The linear support/drive rails may be mounted to the side walls 1018S, floor, or top of the transport chamber and may extend the length of the chamber. This allows the cart 1022C, and hence, the apparatus to traverse the length of the chamber. The cart has a frame, which supports the arm. The frame also supports caster mounts or platens 1022B, which move with or relative to the frame. Any suitable motor such as, for example, a sequential synchronous linear motor may drive the platens 1022B and hence the cart 1022C along the rails. In this exemplary embodiment, the arm is operably connected to the platens 1022A by a suitable linkage/transmission so that when the platens are moved by a drive motor in relative motion to each other the arm is extended or retracted. For instance, the transmission may be arranged so that when the platens are moved apart along the rails the arm is extended to the left, and when moved back closer together the arm is retracted from the left. The platens may also be suitably operated by a linear motor to extend/retract the arm 1022A to/from the right.

The control of movement of the platens over the slide rails with the linear motor, as well as position sensing of the platens and hence of the cart and the extended/retracted position of the arm may be accomplished through the position measurement systems described above. For example, field generating elements or platens MP which may be similar to the iron element 105 or magnet 620 described above, may be affixed to or be part of each of the transport platens 1022A, 1022B such that the fields generated by the platens MP are directed towards the sides 1018S of the chamber 1018. Sensors S such as, for example discrete transformers 109 or sensors 610a-610n or their planar equivalents shown in FIGS. 3 and 7 respectively, may be placed along the sides 1018S of the chamber 1018 along the path of travel of the cart 1022C and the transport platens 1022A, 1022B in a manner described above. It is noted that only a few sensor groups S are shown in the Figure for clarity purposes. It is further noted that any of the different position sensing systems described above may be utilized individually or in any combination thereof such that the location of the cart 1022C can be accurately determined.

The controller 1090 may be configured to sequentially scan the sensors S for output with for example the sensor located at point 1080 being configured as the first scanned sensor such that the position of the cart 1022C is referenced back to point 1080 to provide an absolute position measurement. As described above each of the sensors S may be located at a predetermined distance from any suitable reference point in the chamber 1018 such that as the field generators MP pass any given sensor the position of the field generator MP is roughly known. In other exemplary embodiments the position of the field generator MP may be roughly known by counting the periods or cycles of the outputs produced by the sensors S as described above. A more precise determination of the position of the field generators or platens MP and thus the cart 1022C can be obtained by mathematically manipulating the sensor output as described above. Because each of the platens 1022A, 1022B include a field generator MP the position of each platen 1022A, 1022B can be determined individually such that the platens 1022A, 1022B may be driven in unison in one direction in order to move the entire cart/apparatus in that longitudinal direction inside the transport chamber or driven separately so that the arm carried by the cart 1022C is extended or retracted. It is further noted that the position of the cart 1022C with respect to the chamber walls 1018S (e.g. the air gap between the walls and the cart) can be measured as described above and adjusted accordingly by the controller 1090 so that the cart is at a predetermined location between the walls to aid in the accurate placement of substrates in the processing modules 1020.

Figure 11:
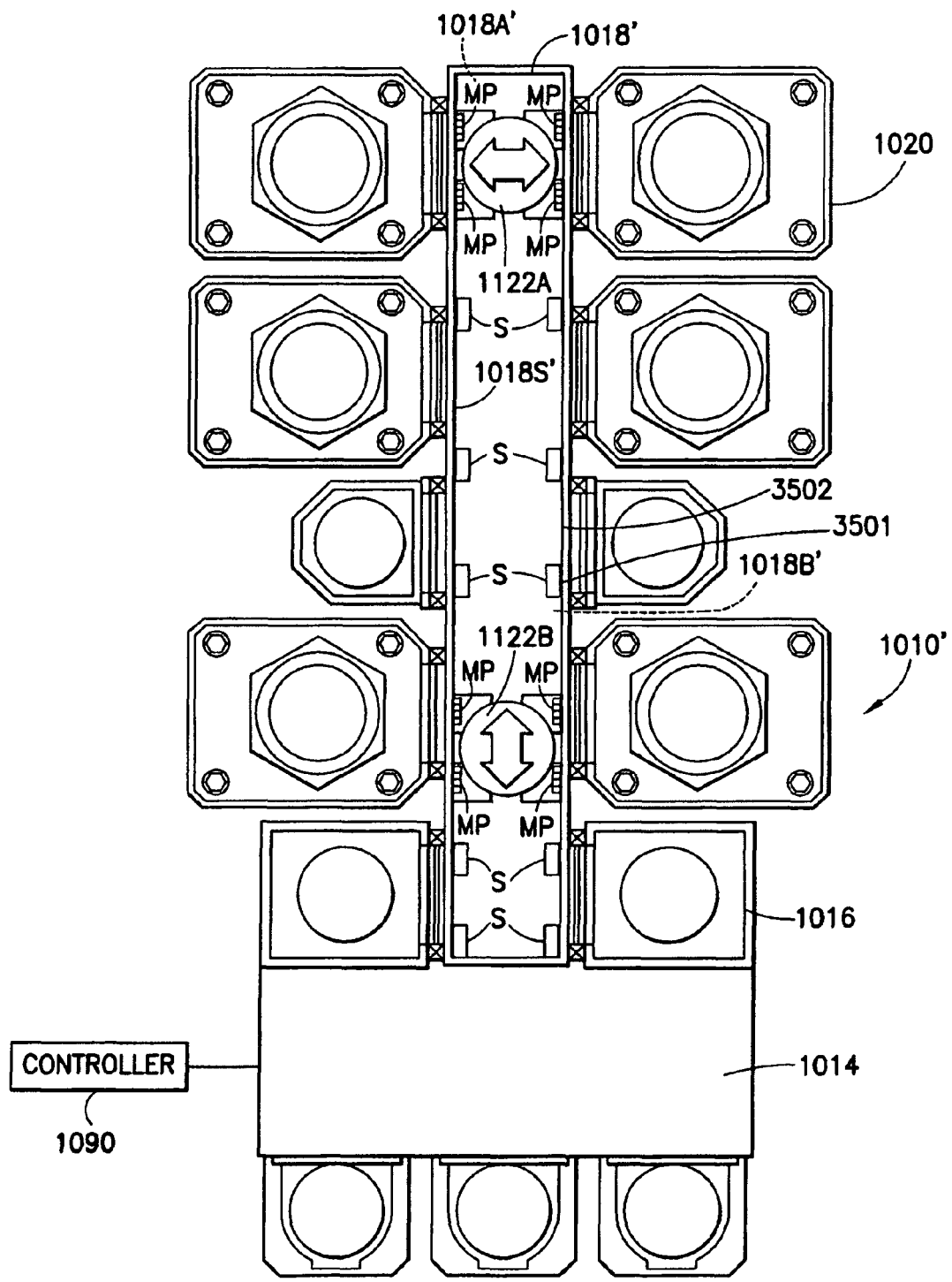

FIG. 11 shows another embodiment of a substrate processing apparatus 1010', which is generally similar to apparatus 1010. In this embodiment, the transport chamber 1018' has two transport apparatus 1122A, 1122B. The transport apparatus 1122A, 1122B are substantially the same as the apparatus 1022 described above with respect to FIG. 10. Both transport apparatus 1122A, 1122B may be supported from a common set of longitudinal slide rails as described before. The platens of the cart corresponding to each apparatus may be driven by the same linear motor drive. Different drive zones of the linear motor may allow the independent driving of individual platens on each cart and thus also the independent driving of each individual cart 1122A, 1122B. Thus, as can be realized the arm of each apparatus can be independently extended/retracted using the linear motor in a manner similar to that described before. However, in this case the substrate transport apparatus 1122A, 1122B are not capable of passing each other in the transport chamber unless separate slide systems are employed. As described above each of the platens of the cart may include field generators or platens MP that interact with the sensors S affixed to the chamber walls 1018S'. In this exemplary embodiment, the processing modules 1020 are positioned along the length of the transport chamber so that the substrate may be transported for processing in the processing module(s) in a sequence which would avoid the transport apparatus from interfering with each other. For example, processing modules for coating may be located before heating modules, and cooling modules and etching modules may be located last.

However, the transport chamber 1018' may have another transport zone 1018A', 1018B' which allows the two transport apparatus 1122A, 1122B to pass over each other (akin to a side rail, bypass rail or magnetically suspended zone that does not require rails). In this case, the other transport zone may be located either above or below the horizontal plane(s) in which the processing modules are located. In this case each transport zone 1018A', 1018B' may have its own set of sensors S so that the position of carts 1122A, 1122B can be individually tracked while the carts are in each of the transport zones 1018A', 1018B'. In alternate embodiments there may be one set of sensors for both transport zones 1018A', 1018B'. In this embodiment the transport apparatus has two slide rails 3501, 3502, one for each transport apparatus 1122A, 1122B. The slide rails 3501, 3502 may be, for example, located one above the other where, for exemplary purposes only, one slide rail may be located in the floor, or side walls of the transport chamber 1018', and the other slide rail may be located in the top of the chamber 1018'. In alternate embodiments, a linear drive system may be employed which simultaneously drives and suspends the carts where the carts may be horizontally and vertically independently moveable, hence allowing them to pass or transfer substrates independent of each other. It is noted that the sensors S in combination with the platens MP can be used to track the vertical position of each of the carts 1122A, 1122B as they pass over/under one another to prevent a collision which may damage the transports or the substrates carried by the transports.

In all embodiments employing electric windings, these windings may also be used as resistance heaters as in the case where it is desired that the chamber be heated for degas as in the case to eliminate water vapor for example. Each transport apparatus in this case may be driven by a dedicated linear drive motor or a dedicated drive zone in which the cart resides similar to that described before.

Figure 14:
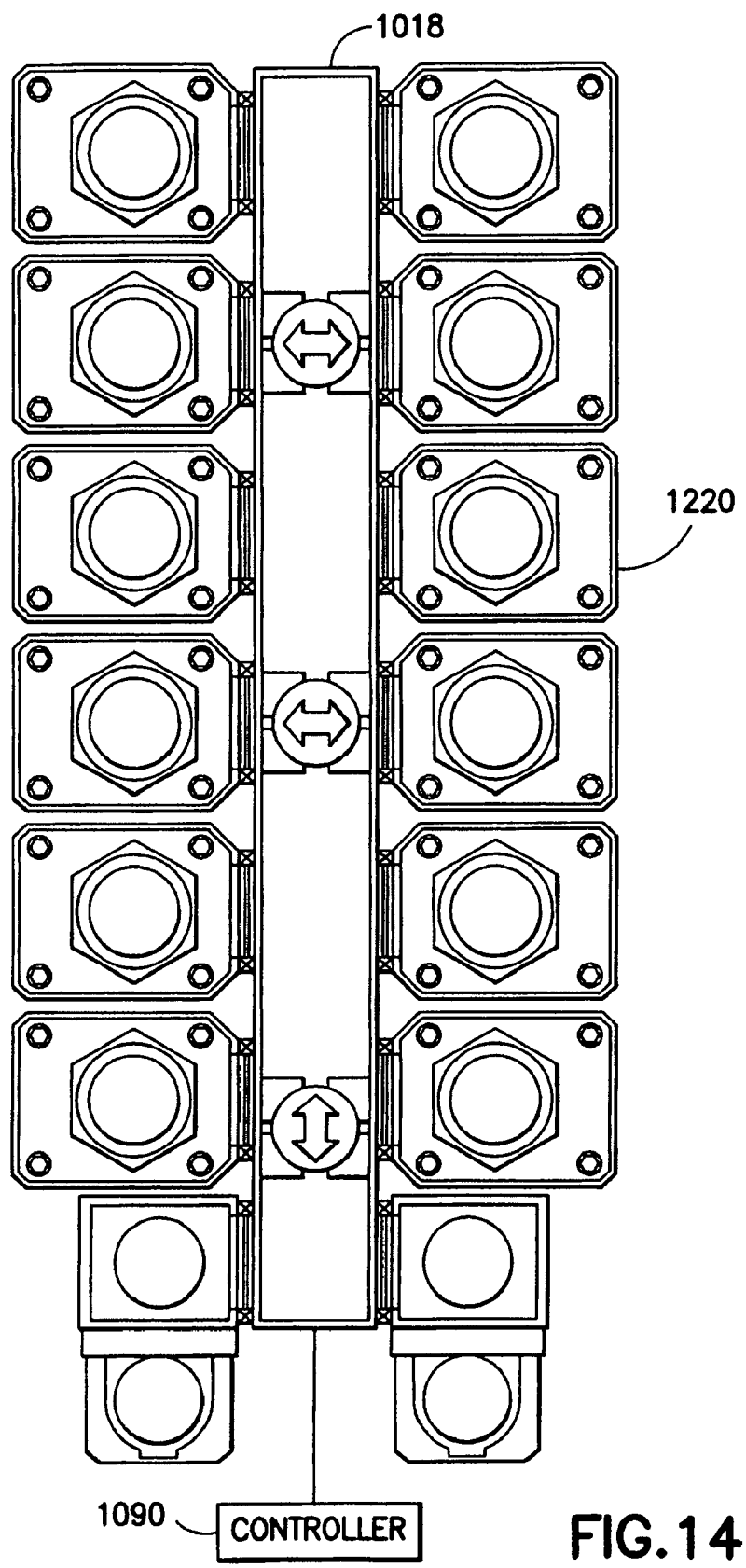
Figure 15:
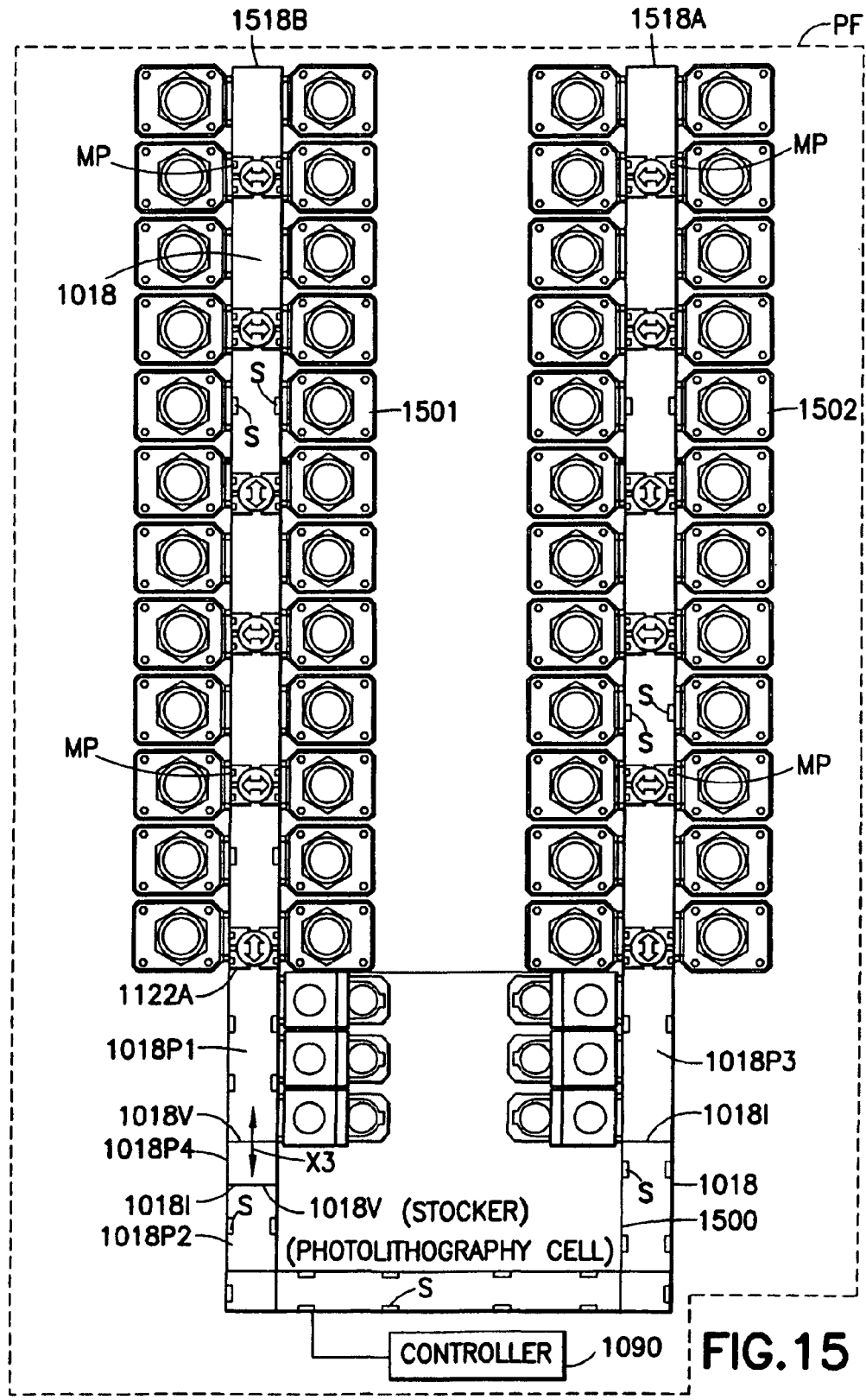

Referring now to FIGS. 14, and 15 there are shown other substrate processing apparatus incorporating the position measurement systems described herein in accordance with other exemplary embodiments. As seen in FIGS. 14 and 15 the transport chamber in these embodiments is elongated to accommodate additional processing modules. The apparatus shown in FIG. 14 has twelve (12) processing modules 1220 connected to the transport chamber 1018, and each apparatus 1518A, 1518B (two apparatus are shown) in FIG. 15 has twenty-four (24) processing modules 1501, 1502 connected to the transport chamber 1018. The numbers of processing modules shown in these embodiments are merely exemplary, and the apparatus may have any other number of processing modules as previously described. The processing modules in these embodiments are disposed along the sides of the transport chamber in a Cartesian arrangement similar to that previously discussed. The number of rows of processing modules in these cases however have been greatly increased (e.g. six (6) rows in the apparatus of FIG. 14, and twelve (12) rows in each of the apparatus of FIG. 15). In the embodiment of FIG. 14, the EFEM may be removed and the load ports may be mated directly to load locks. The transport chamber of the apparatus in FIGS. 14 and 15 have multiple transport apparatus (i.e. three apparatus in the case of FIG. 14, and six apparatus in the case of FIG. 15) to handle the substrates between the load locks and the processing chambers. The number of transport apparatus shown are merely exemplary and more or fewer apparatus may be used. The transport apparatus in these embodiments are generally similar to that previously described, comprising an arm and a cart where the position of the cart and extension/retraction of the arm is tracked with the multi-dimensional position measurement systems as described above. In this case, however, the cart is supported from zoned linear motor drives located in, for example, the side walls of the transport chamber. In alternate embodiments the drives may be located at any suitable location in the transport chamber. The linear motor drives in this case provide for translation of the cart in two orthogonal axis (i.e. longitudinally in the transport chamber and vertically in the transport chamber). Accordingly, the transport apparatus are capable of moving past one another in the transport chamber. The transport chamber may have "passing" or transport areas above and/or below the plane(s) of the processing modules, through which the transport apparatus may be routed to avoid stationary transport apparatus (i.e. picking/releasing substrates in the processing modules) or transport apparatus moving in opposite directions. As can be realized, the substrate transport apparatus has a controller, such as controller 1090, for controlling the movements of the multiple substrate transport apparatus.

Still referring to FIG. 15, the substrate processing apparatus 1518A and 1518B in this case may be mated directly to a tool 1500.

As may be realized from FIGS. 10, 11 and 14-15 the transport chamber 1018 may be extended as desired to run throughout the processing facility PF. As seen in FIG. 15, and as will be described in further detail below, the transport chamber may connect and communicate with various sections or bays, 1518A, 1518B in the processing facility PF such as for example storage, lithography tool, metal deposition tool or any other suitable tool bays. Bays interconnected by the transport chamber 1018 may also be configured as process bays or processes 1518A, 1518B. Each bay has desired tools (e.g. lithography, metal deposition, heat soaking, cleaning) to accomplish a given fabrication process in the semiconductor workpiece. In either case, the transport chamber, generally referred to as transport chamber 1018 has processing modules, corresponding to the various tools in the facility bays, communicably connected thereto, as previously described, to allow transfer of the semiconductor workpiece between chamber and processing modules. Hence, the transport chamber may contain different environmental conditions such as atmospheric, vacuum, ultra high vacuum, inert gas, or any other, throughout its length corresponding to the environments of the various processing modules connected to the transport chamber. Accordingly, the section 1018P1 of the chamber in a given process or bay 1018A, 1018B, or within a portion of the bay, may have for example, one environmental condition (e.g. atmospheric), and another section 1018P2, 1018P3 of the chamber may have a different environmental condition. As noted before, the section 1018P1, 1018P2, 1018P3 of the chamber with different environments therein may be in different bays of the facility, or may all be in one bay of the facility. FIG. 15 shows the chamber 1018 having three at least three sections 1018P1, 1018P2, 1018P3 with different environments for example purposes only. The chamber 1018 in this embodiment may have any suitable number of sections with any suitable number of different environments. Each of the sections 1518A, 1518B, 1018P1, 1018P2, 1018P3 may have sensors S positioned as described above along the walls of the respective transport sections. In alternate embodiments, any combination of the exemplary position measurement systems described herein may be utilized in any one of the transport sections 1518A, 1518B, 1018P1, 1018P2, 1018P3.

As seen in FIG. 15, the transport apparatus, which may be similar to apparatus 1122A, (see also FIG. 11) in the chamber 1018 are capable of transiting between sections 1018P1, 1018P2, 1018P3 of the chamber with different environments therein. Hence, as can be realized from FIG. 15, the transport apparatus 1122A may, with one pick, move a semiconductor workpiece from the tool in one process or bay 1518A of the processing facility to another tool with a different environment in a different process or bay 1518B of the process facility. For example, transport apparatus 1122A may pick a substrate in processing module 1501, which may be an atmospheric module, lithography, etching or any other suitable processing module in section 1018P1, of transport chamber 1018. The transport apparatus 1122A may then move in the direction indicated by arrow X3 in FIG. 15 from section 1018P1 of the chamber to section 1018P3. In section 1018P3, the transport apparatus 1122A may place the substrate in processing module 1502, which may be any suitable processing module.

As can be realized from FIG. 15, the transport chamber may be modular, with chamber modules connected as desired to form the chamber 1018. The modules may include internal walls 1018I, similar to walls 1018F, 1018R in FIG. 10, to segregate sections 1018P1, 1018P2, 1018P3, 1018P4 of the chamber. Internal walls 1018I may include slot valves, or any other suitable valve allowing one section of the chamber 1018P1, 1018P4 to communicate with one or more adjoining sections. The slot valves 1018V, may be sized to allow, one or more carts to transit through the valves from one section 1018P1, 1018P4 to another. In this way, the carts 1122A may move anywhere throughout the chamber 1018. The valves may be closed to isolate sections 1018P1, 1018P2, 1018P3, 1018P4 of the chamber so that the different sections may contain disparate environments as described before. Further, the internal walls of the chamber modules may be located to form load locks 1018P4 as shown in FIG. 10. The load locks 1018P4 (only one is shown in FIG. 15 for example purposes) may be suitably located in chamber 1018 and may hold any suitable number of carts 1122A therein.

Figure 16:
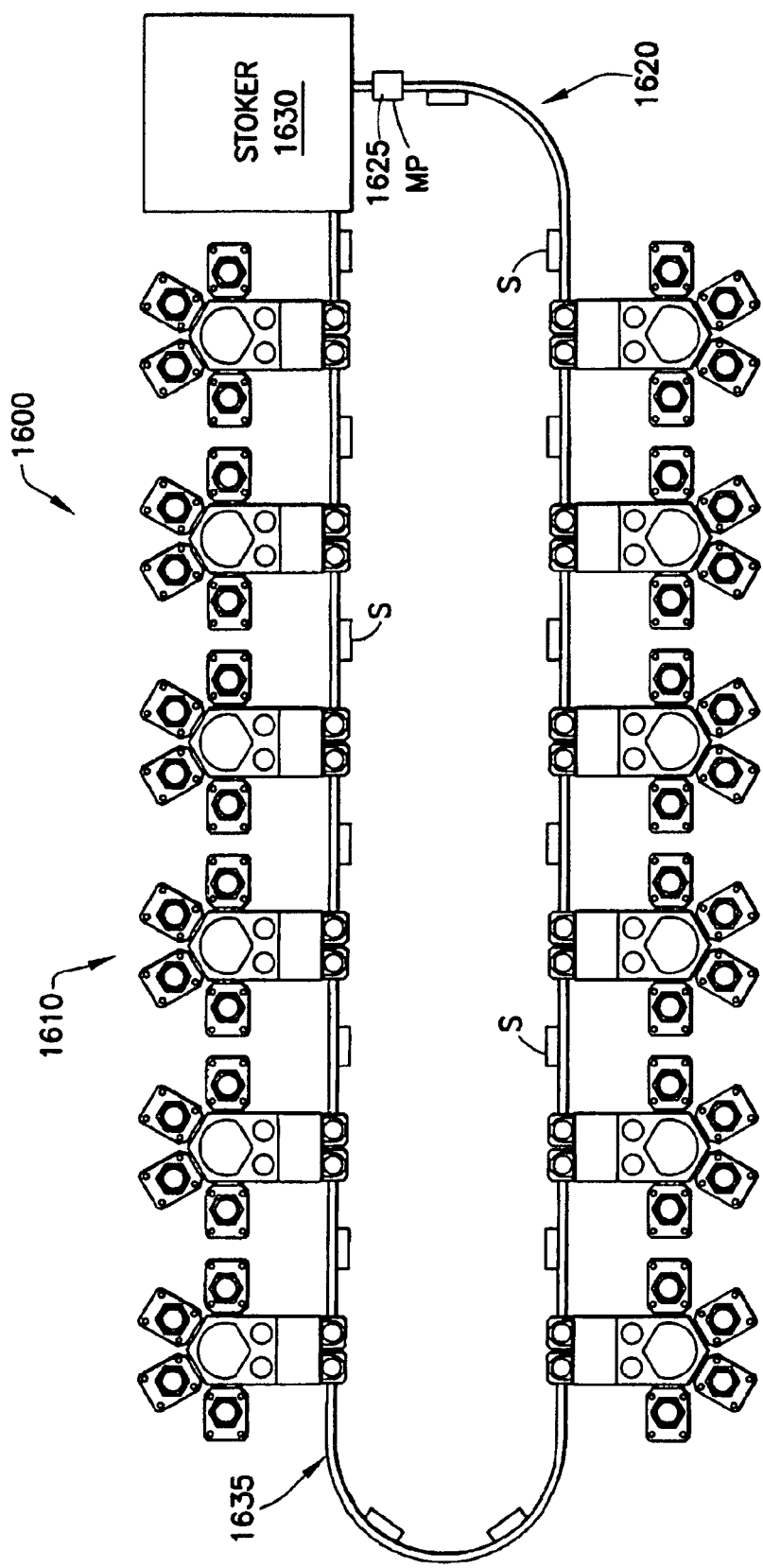

Referring now to FIG. 16, there is shown an exemplary fabrication facility layout employing an automated material handling system (AMHS) 1620. In this exemplary embodiment workpieces are transported from the stocker 1630 by the AMHS to one or more of the processing tools 1610. The AMHS may incorporate one or more transport carts 1625 and a transport track 1635. The transport track 1635 may be any suitable track. The transport track may include sensor groups S spaced along the track as described above. The transport cart 1625 may include one or more magnetic platens MP that interact with the sensor groups S to provide position measurements for the cart 1625 as described above.

As may be realized, the position of the object, such as for example cart 1625 whose position is to be measured or tracked may be tracked using sensors that are near each end of the object 1625 so that the controller can accommodate for multiple objects along the same transport path that may be trailing one another to avoid contact between the objects. For example, the field generating elements 105, 620 (See FIGS. 1A-C and 6) may be located at the corners of the cart 1625. In alternate embodiments, the object 1625 may be tracked using a sensor at one end of the object 1625 where the length of the object is known. In other alternate embodiments the field generating elements 105, 620 may be located at any known position on the object where the limits of the object can be calculated from the known position. Here the controller may use the position of the first end of the object obtained by the position measurement systems described herein and add or subtract the length of the object to determine the amount of space along the transport path the object occupies. In still other alternate embodiments the field generating elements may be placed at any suitable location on the object to be tracked.

It should be realized that although the exemplary embodiments described herein are described with respect to linear drive systems, the exemplary embodiments can be adapted to be utilized in rotational drives. For example, the disclosed embodiments can be used to track the rotational speed and axial location of an object within a cylinder while at the same time measuring the distance between the rotating object and a wall of the cylinder in a manner substantially similar to that described herein with respect to the linear drive systems.

The exemplary embodiments described herein provide a position measurement system capable of measuring an unlimited length along a first axis, while simultaneous measuring a position along a second and third axis which eliminates switching between multiple sensors. The position measurement systems described herein can be incorporated into any suitable transport apparatus. Although the embodiments described herein are disclosed as measuring two or three axes simultaneously it should be realized that several measurement systems can be combined to measure more than three axes. Conversely, the exemplary embodiments described herein may also be utilized and configured to measure less than two or three axes. It should also be realized that the exemplary embodiments disclosed herein may be used individually or in any combination thereof. The exemplary embodiments also provide a position measurement system where power does not have to be transmitted to the movable object to obtain positional information for the object making the positioning system suitable for applications where the moving object is in, for example, a vacuum. Position and gap measurements are also determined from a fixed location on the moving object, which is convenient for motion control purposes. It is noted that while the iron element and field generating elements are described as being located on the movable object and the sensors are described as being located on a stationary reference frame, in alternate embodiments the sensors may be located on the movable object and the iron elements and field generating elements may be located on the stationary reference frame.

It should be understood that the exemplary embodiments described herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus comprising:
   a controller;
   a transport in communication with the controller having a movable portion and a transport path; and
   a multi-dimensional position measurement device in communication with the controller, the multi-dimensional position measurement device including a plurality of transformers and at least one element attached to the movable portion;
   wherein the multi-dimensional position measurement device is configured so that a circuit is completed in at least one of the plurality of transformers as the at least one element passes proximate to the at least one of the plurality of transformers and the controller is configured to simultaneously calculate a multi-dimensional position of the movable object based on an output of the at least one of the plurality of transformers, wherein the multi-dimensional position includes a gap between the movable portion and the plurality of transformers.

2. The apparatus of claim 1, wherein each one of the plurality of transformers includes a primary winding and a secondary winding wrapped around a common core.

3. The apparatus of claim 2, wherein the controller is configured to calculate a multi-dimensional position of the movable object based on a voltage induced in the secondary winding.

4. The apparatus of claim 1, wherein the plurality of transformers are successively arranged along a first axis and a secondary winding of each of the plurality of transformers are connected to voltage busses so that secondary windings of successive transformers have alternating polarities.

5. The apparatus of claim 4, wherein the voltage busses include a first and second voltage bus where secondary windings connected to the first voltage bus produce a first output signal and secondary windings connected to the second voltage bus produce a second signal that is phase shifted from the first signal.

6. The apparatus of claim 5, wherein the controller is configured to determine a position of the movable object along a first axis and second axis based on the first and second output signals.

7. The apparatus of claim 1, wherein the plurality of transformers are arranged along a first axis and a third axis where secondary windings of the plurality of transformers are connected to voltage busses so that secondary windings of successive transformers along the first and third axes have alternating polarities.

8. The apparatus of claim 7, wherein the voltage busses include a first, second, third and fourth voltage bus where secondary windings connected to the first and third voltage busses produce a first and third output signals and secondary windings connected to the second and fourth voltage busses produce a second and fourth output signal where the second output signal is phase shifted from first output signal and the fourth output signal is phase shifted from the third output signal.

9. The apparatus of claim 8, wherein the controller is configured to determine position of the movable object along a first and second axis based on the first and second output signals and to determine a position of the movable object along a third axis based on the third and fourth output signals.

10. The apparatus of claim 9, wherein the controller is configured to simultaneously determine a three dimensional position of the movable object wherein the three dimensional position comprises a planar position and an air gap between the movable object and the plurality of transformers.

11. A position measurement system comprising:
    a controller;
    a transport in communication with the controller having a movable portion and a transport path; and
    a multi-dimensional position measurement device in communication with the controller, the multi-dimensional position measurement device including at least one element attached to the movable portion and a plurality of sensing elements configured to produce an output voltage in response to the at least one element moving in proximity to at least one of the plurality of sensing elements;
    wherein the controller is configured to calculate a multi-dimensional position of the movable object based on the output voltage of the at least one of the plurality of sensing elements, wherein the multi-dimensional position includes a gap between the movable portion and the plurality of sensing elements.

12. The position measurement system of claim 11, wherein the sensing elements comprise Hall effect sensors and the at least one element attached to the movable portion comprises at least one magnet.

13. The position measurement system of claim 11, wherein the plurality of sensing elements comprise transformers wherein each of the transformers includes a primary winding and a secondary winding wrapped around a common core.

14. The position measurement system of claim 13, wherein the controller is configured to calculate a multi-dimensional position of the movable object based on a voltage induced in the secondary winding.

15. The position measurement system of claim 11, wherein the plurality of sensing elements are successively arranged along a first axis and a secondary winding of each of the plurality of sensing elements are connected to voltage busses so that secondary windings of successive sensing elements have alternating polarities.

16. The position measurement system of claim 15, wherein the voltage busses include a first and second voltage bus where secondary windings connected to the first voltage bus produce a first output signal and secondary windings connected to the second voltage bus produce a second signal that is phase shifted from the first signal.

17. The position measurement system of claim 16, wherein the controller is configured to determine a position of the movable object along a first axis and second axis based on the first and second output signals.

18. The position measurement system of claim 11, wherein the plurality of sensing elements are arranged along a first axis and a third axis where secondary windings of the plurality of sensing elements are connected to voltage busses so that secondary windings of successive sensing elements along the first and third axes have alternating polarities.

19. The position measurement system of claim 18, wherein the voltage busses include a first, second, third and fourth voltage bus where secondary windings connected to the first and third voltage busses produce a first and third output signals and secondary windings connected to the second and fourth voltage busses produce a second and fourth output signal where the second output signal is phase shifted from first output signal and the fourth output signal is phase shifted from the third output signal.

20. The position measurement system of claim 19, wherein the controller is configured to determine position of the movable object along a first and second axis based on the first and second output signals and to determine a position of the movable object along a third axis based on the third and fourth output signals.

21. The position measurement system of claim 18, wherein the controller is configured to simultaneously determine a three dimensional position of the movable object wherein the three dimensional position comprises a planar position and an air gap between the movable object and the plurality of sensing elements.

22. A method comprising:
  inducing at least one output signal in at least a portion of at least one sensing element in response to at least one movable element moving into proximity with the at least one sensing element; and
  calculating a multi-dimensional position of a movable object to which the movable element is attached based on the at least one output signal of the at least one sensing element;
  wherein the multi-dimensional position includes a gap between the movable object and the at least one sensing element.

23. The method of claim 22, wherein calculating the multi-dimensional position comprises calculating a planar position of the movable object and an air gap between the movable object and the at least one sensing element.

24. The method of claim 22, wherein inducing at least one output signal comprises inducing an output signal in at least one Hall effect sensor.

25. The method of claim 22, wherein the at least one sensing element comprises a primary winding and a secondary winding wrapped around a common core and inducing at least one output signal comprises inducing a signal in the secondary winding.

26. The method of claim 25, wherein calculating a multi-dimensional position comprises calculating the three dimensional position of the movable object based on a voltage induced in the secondary winding.

27. The method of claim 22, further comprising successively arranging the at least one sensing element along a first axis and a secondary winding of each of the at least one sensing element is connected to voltage busses so that secondary windings of successive sensing elements have alternating polarities.

28. The method of claim 27, wherein the voltage busses include a first and second voltage bus where secondary windings connected to the first voltage bus produce a first output signal and secondary windings connected to the second voltage bus produce a second signal that is phase shifted from the first signal.

29. The method of claim 28, wherein calculating the multi-dimensional position includes determining a position of the movable object along a first axis and second axis based on the first and second output signals.

30. The method of claim 22, further comprising arranging the at least one sensing element along a first axis and a third axis where a secondary winding of the at least one sensing element is connected to voltage busses so that secondary windings of successive sensing elements along the first and third axes have alternating polarities.

31. The method of claim 30, wherein the voltage busses include a first, second, third and fourth voltage bus where secondary windings connected to the first and third voltage busses produce a first and third output signals and secondary windings connected to the second and fourth voltage busses produce a second and fourth output signal where the second output signal is phase shifted from first output signal and the fourth output signal is phase shifted from the third output signal.

32. The method of claim 31, wherein calculating the multi-dimensional position includes determining a position of the movable object along a first and second axis based on the first and second output signals and determining a position of the movable object along a third axis based on the third and fourth output signals.

* * * * *